United States Patent
Araki et al.

(10) Patent No.: US 7,262,252 B2
(45) Date of Patent: Aug. 28, 2007

(54) NONLINEAR OPTICAL MATERIALS COMPRISING FLUORINE-CONTAINING POLYMER

(75) Inventors: Takayuki Araki, Settsu (JP); Yoshito Tanaka, Settsu (JP); Mihoko Ohashi, Settsu (JP); Yuzo Komatsu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/704,829

(22) Filed: Nov. 12, 2003

(65) Prior Publication Data

US 2005/0004253 A1   Jan. 6, 2005

Related U.S. Application Data

(63) Continuation-in-part of application No. PCT/JP02/04729, filed on May 16, 2002.

(30) Foreign Application Priority Data

May 17, 2001   (JP)   ............... 2001-147649

(51) Int. Cl.
F21V 9/04 (2006.01)
C07D 211/78 (2006.01)
C07D 211/90 (2006.01)
C08F 20/02 (2006.01)
C08F 4/34 (2006.01)
C08F 226/06 (2006.01)
C09K 19/52 (2006.01)

(52) U.S. Cl. ............... 525/326.2; 252/587; 252/589; 252/582; 252/299.01; 525/266; 525/329.7; 525/330.3; 525/276; 525/279; 525/289; 525/291; 525/292; 526/243; 526/245; 526/298; 526/311; 546/286; 546/288; 546/289; 546/298

(58) Field of Classification Search ............. 525/326.2; 252/587, 589; 546/286, 288; 526/311, 298
See application file for complete search history.

(56) References Cited

U.S. PATENT DOCUMENTS

| 4,957,655 A | * | 9/1990 | Khanarian et al. | ..... 252/299.01 |
| 4,973,429 A | * | 11/1990 | Decher et al. | ............... 252/587 |
| 5,087,672 A | * | 2/1992 | Babirad et al. | .......... 525/329.5 |
| 5,171,803 A | * | 12/1992 | Walton et al. | ............... 526/243 |
| 5,187,234 A | * | 2/1993 | Leslie et al. | ................. 525/276 |
| 6,221,987 B1 | * | 4/2001 | Sugiyama | ................... 526/231 |
| 6,228,977 B1 | | 5/2001 | Kanitz et al. | |
| 2002/0161101 A1 | * | 10/2002 | Carroll et al. | .............. 524/495 |
| 2004/0001916 A1 | | 1/2004 | Araki et al. | |

FOREIGN PATENT DOCUMENTS

| JP | 3-9329 A | 1/1991 |
| JP | 4-255716 A | 9/1992 |
| JP | 5-66437 A | 3/1993 |
| JP | 5-142600 A | 6/1993 |
| JP | 5-230151 | 9/1993 |
| JP | 6-248026 | 9/1994 |
| JP | 2000-26540 A | 1/2000 |

OTHER PUBLICATIONS

Textbook of Polymer Science, Fred W. Billmeyer, Jr. 3$^{rd}$, 1984, pp. 83, 50.*
"Textbokk of Polymer Science", Billmeyer, 3$^{rd}$ Ed. pp. 50,83.*
http://www..chem.wisc.edu/~yethiraj/research/lcpsim.html—website.*
http://en.wikipedia.org/wiki/Liquid_crystal—website.*
http://www.chem.wise.edu/~yethiraj/research/lcpsim.html.*
English Translation of International Preliminary Examination Report for PCT/JP02/04729 dated Mar. 12, 2003.
International Search Report for PCT/JP02/04729 dated Jul. 2, 2002.
International Preliminary Examination Report for PCT/JP02/04729.

* cited by examiner

Primary Examiner—Frank Lawrence
Assistant Examiner—Ives Wu
(74) Attorney, Agent, or Firm—Sughrue Mion, PLLC

(57) ABSTRACT

There is provided a fluorine-containing resin composition which is used for nonlinear optical material and comprises (I) a fluorine-containing prepolymer and (II) an organic compound exhibiting a second- or higher-order nonlinear optical effect, in which the fluorine-containing prepolymer (I): (1) is a non-crystalline polymer having a fluorine content of not less than 25% and (2) has a carbon-carbon double bond in a polymer side chain or at an end of a polymer trunk chain and also there is provided a nonlinear optical waveguide device produced from the fluorine-containing resin composition. A suitable nonlinear optical material having a stable structure with a nonlinear substance is produced, and an excellent nonlinear optical waveguide device is produced by relatively simple steps while maintaining transparency in a near infrared region.

27 Claims, 1 Drawing Sheet dimethylpyrazole (DMNP), (2,2-dicyanovinyl)anisol (DIVA) and 4'-nitrobenzylidene-3-acetoamino-4-methoxyaniline (MNBA) are used as a wavelength conversion material. Those materials are processed into fiber type or slab type optical waveguides for
NONLINEAR OPTICAL MATERIALS COMPRISING FLUORINE-CONTAINING POLYMER

CROSS-REFERENCE TO RELATED APPLICATION

This is a continuation-in-part of PCT international application No. PCT/JP02/04729 filed on May 16, 2002, incorporated herein by reference.

BACKGROUND OF THE INVENTION

The present invention relates to a fluorine-containing resin composition comprising a fluorine-containing prepolymer containing a carbon-carbon double bond in its molecular chain, a fluorine-containing nonlinear optical material obtained by curing the composition and an optical waveguide device obtained from the fluorine-containing nonlinear optical material.

A nonlinear optical material of the present invention means a starting substance which exhibits a nonlinear optical effect when used on functional optical devices and optical parts. The nonlinear optical effect means an optical effect arising as a result of a nonlinear polarization becoming not ignorable in polarization of atom and molecule which is induced by strong external electric field. For example, Pockels effect, parametric oscillation, second harmonic generation, etc. are known in a second-order nonlinear optical effect, and Kerr effect, electrostatic induction SHG, third harmonic generation (THG), change in a refractive index due to optical intensity, etc. are known in a third-order nonlinear optical effect. The second-order nonlinear optical effect can be applied on a wavelength conversion (SHG) device, electro-optical modulator, etc. and the third-order nonlinear optical effect can be applied on a wavelength conversion (THG) device, optical computing by high speed optical shutter, optical bistability device, optical switching, etc.

Inorganic ferroelectric materials such as potassium dihydrogen phosphate (KDP), lithium niobate (LiNbO$_3$) and the like have been so far known as nonlinear optical materials. However those materials have a problem that a response speed is slow due to deliquescence, low dielectric breakdown strength and further high dielectric constant, and therefore an applicable frequency range is limited. Also 2-methyl-4-nitroaniline (MNA) providing a higher nonlinear optical response than that of the above-mentioned inorganic ferroelectric materials was found by B. F. Levine, et al. in 1979, and since then research and development of organic nonlinear optical materials have been proceeded positively.

With respect to those organic nonlinear optical materials, applications thereof as new optical materials can be expected since a larger nonlinear optical constant, a higher nonlinear optical response and a higher dielectric breakdown strength can be expected as compared with inorganic ferroelectric materials. Further the organic nonlinear optical materials have an advantage that a wide variety of molecular design conditions and applications on various devices can be considered, and therefore attention is directed thereto as basic materials in the field of opto-electronics in the future.

Actually bulk single crystals obtained from MNA, 1-(4-nitrophenyl)-3,5-dimethylpyrazole (DMNP), (2,2-dicyanovinyl)anisol (DIVA) and 4'-nitrobenzylidene-3-acetoamino-4-methoxyaniline (MNBA) are used as a wavelength conversion material. Those materials are processed into fiber type or slab type optical waveguides for trial manufacture of optical frequency multiplier devices (Optical Functional Material, pp. 41-105, Kyoritsu Shuppan).

However when using the bulk single crystals, productivity and processability are inferior and therefore the use thereof is not suitable for mass production. On the other hand, in case of optical waveguides produced using high molecular weight materials, a film forming process by a spin coat method, etc. can be employed and therefore production process is easy and an area of the waveguide can also be made large. Further generally the high molecular weight materials are free from deliquescence and are high in a dielectric breakdown strength and therefore are superior to inorganic materials. There have been studied many trials to use, as a nonlinear optical material, a high molecular weight composition comprising a high molecular weight material containing an organic nonlinear material.

Such a high molecular weight composition generally has no orientation and cannot be used as it is as a material for optical switches and modulation devices which make use of an electro-optical effect. Generally there is employed a method of applying, for orientation, a direct current field on a high molecular weight material free from orientation while heating, namely a method of exhibiting an electro-optical effect by poling treatment.

However there is a serious problem that after the poling, when the material temperature is decreased to normal temperature and then is allowed to stand or is used, orientation thereof is lost and an electro-optical effect disappears. So far energies have been concentrated on a study of polymethacrylate (PMMA), etc. as a high molecular weight material for an optical waveguide, but a glass transition temperature (TG) thereof is as low as about 150° C. and there is a problem that the orientation generated by the poling disappears completely when heat history of not less than 200° C. is unavoidably suffered during production of an optical integrated circuit.

In order to exhibit a nonlinear optical effect efficiently in the optical waveguides, it is desired that a material to be used has a large nonlinear optical constant and is excellent in light transmission properties (transparency). When light source having a wavelength of 1.3 μm or 1.5 μm band is used for those optical waveguides, since a carbon-hydrogen bond and oxygen-hydrogen bond of the organic material have absorption of light having a wavelength in the above-mentioned range, there arises a phenomenon that light transmission is decreased and a nonlinear optical effect is lowered. Accordingly studies have been made to replace such hydrogen atom with heavy hydrogen (D) or with fluorine. As a result, though lowering of transparency can be improved to a certain extent, in case of the replacement with heavy hydrogen, water absorbing properties of the material does not change but absorption of near infrared light is increased due to absorption of water and transparency is lowered. In case of the replacement with fluorine, increase in a glass transition temperature is not recognized and the above-mentioned problem (disappearing of orientation) is not solved.

As a high molecular weight material which has a good transparency in a near infrared wavelength region, is relatively low in loss of light and has a low water absorption, there are proposed non-crystalline fluorine-containing perfluoro polymers having a ring structure (JP3-9329A, JP4-190202A, JP2000-81519A, etc.).

Though those non-crystalline fluorine-containing polymers have no problem with transparency, there is the above-mentioned problem (disappearing of orientation) attributable to poor heat resistance, that is, a low glass transition temperature. In case of a polymer system having a sufficiently increased glass transition temperature by changing a structure and components thereof, the polymer itself becomes fragile and there is a problem that cracking arises in a process for forming a waveguide. Thus all the problems in nonlinear optical materials have not been solved.

SUMMARY OF THE INVENTION

In the light of the above-mentioned situation, an object of the present invention is to provide a nonlinear optical material which exhibits a large second- or higher-order nonlinear optical effect and assures a small loss of light transmission and to provide a nonlinear optical waveguide device produced therefrom.

The present inventors have made intensive studies to attain the above-mentioned object, and as a result, have found a non-crystalline fluorine-containing prepolymer characterized by having a carbon-carbon double bond in the polymer side chain or at an end of the polymer trunk chain and a nonlinear optical material prepared in combination of the prepolymer and an organic compound exhibiting a nonlinear optical effect, and thus have completed the present invention.

The first of the present invention relates to a fluorine-containing resin composition which is used for a nonlinear optical material and comprises (I) a non-crystalline fluorine-containing prepolymer having a fluorine content of not less than 25% by weight and having an ethylenic carbon-carbon double bond in the polymer side chain or at an end of the polymer trunk chain and (II) an organic compound exhibiting a second- or higher-order nonlinear optical effect.

The fluorine-containing prepolymer (I) is more preferably a fluorine-containing prepolymer having a maximum absorption coefficient of not more than 1 cm$^{-1}$ in wavelength ranges of from 1,290 to 1,320 nm and/or from 1,530 to 1,570 nm and/or from 600 to 900 nm.

Particularly preferable fluorine-containing prepolymer (I) is a polymer having a number average molecular weight of from 500 to 1,000,000 which is represented by the formula (1):

 (1)

in which the structural unit M is a structural unit derived from a fluorine-containing ethylenic monomer and represented by the formula (M):

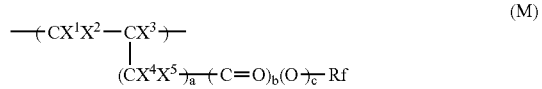 (M)

wherein $X^1$ and $X^2$ are the same or different and each is H or F; $X^3$ is H, F, CH$_3$ or CF$_3$; $X^4$ and $X^5$ are the same or different and each is H, F or CF$_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

The second of the present invention relates to a nonlinear optical material obtained by curing the above-mentioned fluorine-containing resin composition.

The third of the present invention relates to a fluorine-containing nonlinear optical material produced from a fluorine-containing polymer having a number average molecular weight of from 500 to 1,000,000 which is represented by the formula (2):

 (2)

in which the structural unit M' is a structural unit derived from a fluorine-containing ethylenic monomer and represented by the formula (M'):

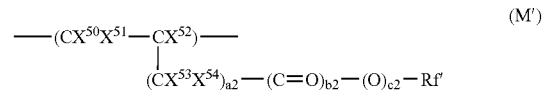 (M')

wherein $X^{50}$ and $X^{51}$ are the same or different and each is H or F; $X^{52}$ is H, F, CH$_3$ or CF$_3$; $X^{53}$ and $X^{54}$ are the same or different and each is H, F or CF$_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; b2 and c2 are the same or different and each is 0 or 1, the structural unit A1 is a structural unit derived from monomer copolymerizable with the fluorine-containing ethylenic monomer represented by the formula (M'), and the structural unit M' and the structural unit A1 are contained in amounts of from 0.1 to 100% by mole and from 0 to 99.9% by mole, respectively.

The fourth of the present invention relates to a fluorine-containing nonlinear optical material produced from a fluorine-containing polymer having a number average molecular weight of from 500 to 1,000,000 which is represented by the formula (3):

 (3)

in which the structural unit M is the structural unit of the formula (M) of claim 12, the structural unit M' is the structural unit of the formula (M') of claim 22 and the structural unit A2 is a structural unit derived from monomer copolymerizable with the fluorine-containing ethylenic monomers represented by the formulae (M) and (M'), and the structural unit M, the structural unit M' and the structural unit A2 are contained in amounts of from 0.1 to 99.9% by mole, from 0.1 to 99.9% by mole and from 0 to 99.8% by mole, respectively.

The fifth of the present invention relates to optical waveguide devices produced from the nonlinear optical materials of the above-mentioned second to fourth inventions.

DETAILED DESCRIPTION

Figure 1:
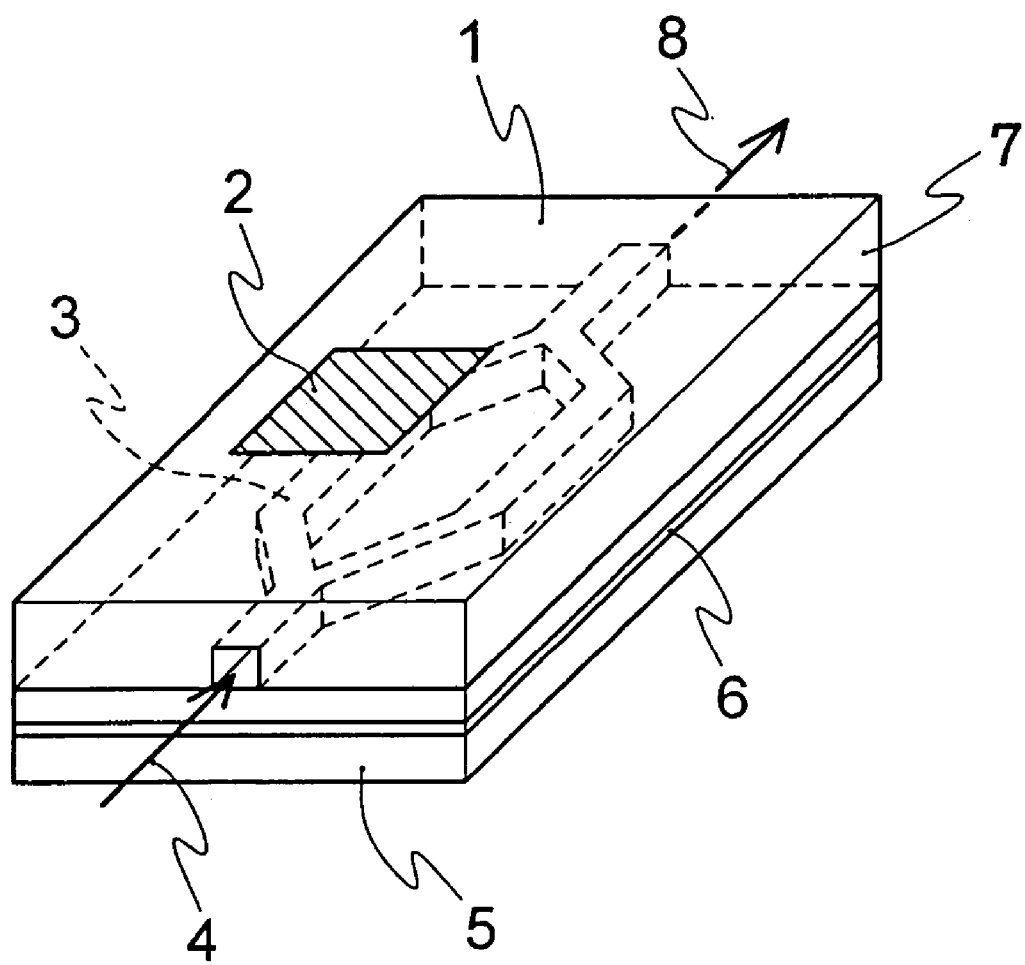
FIG. 1 is a diagrammatic perspective view of the Mach Zehnder interferometer type optical device produced in Example 22.

A suitable polymer which is used as the fluorine-containing prepolymer (I) in the present invention is, as mentioned above, the fluorine-containing prepolymer having a number average molecular weight of from 500 to 1,000,000 which is represented by the formula (1):

           (1)

in which the structural unit M is a structural unit derived from a fluorine-containing ethylenic monomer and represented by the formula (M):

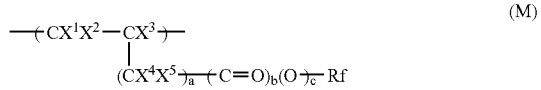           (M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

Namely, the polymer is a homopolymer of the structural unit M derived from a fluorine-containing ethylenic monomer which has, in the polymer side chain, an ethylenic carbon-carbon double bond curable by reaction or a copolymer having the structural unit M as an essential component.

It is preferable that in the Rf of the structural unit M, at least one of $Y^1$ is bonded to an end of the Rf.

In the fluorine-containing prepolymer (I) which is used in the present invention, particularly preferable structural unit M is a F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

The fluorine-containing prepolymer containing the structural unit M1 is preferred since its near infrared transparency is particularly high and the near infrared transparency can be increased in case of not only a homopolymer of the structural unit M1 but also a copolymer comprising an increased amount of the structural unit M1.

More preferred example of the structural unit M1 is a structural unit M2 derived from a fluorine-containing ethylenic monomer and represented by the formula (M2):

           (M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M2 is a structural unit of a fluorine-containing allyl ether having an ethylenic carbon-carbon double bond at its end and is preferred since not only near infrared transparency can be increased but also polymerizability, particularly homopolymerizability and copolymerizability with other fluorine-containing ethylenic monomer are good.

Also another preferred example of the structural unit M1 is a structural unit M3 derived from a fluorine-containing ethylenic monomer and represented by the formula (M3):

           (M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M3 is a structural unit of a fluorine-containing vinyl ether having an ethylenic carbon-carbon double bond at its end and is preferred since near infrared transparency can be made high and also its copolymerizability with other fluorine-containing ethylenic monomer is good.

In the fluorine-containing prepolymer (I) of the formula (1) which is used in the present invention, $Y^1$ contained in the structural units M, M1, M2 and M3 is, as mentioned above, a monovalent organic group having 2 to 10 carbon atoms and an ethylenic carbon-carbon double bond at its end.

The carbon-carbon double bond in $Y^1$ has an ability of causing a polycondensation reaction, etc. and can provide a cured (crosslinked) article. Concretely the carbon-carbon double bond causes a polymerization reaction and condensation reaction between the molecules of the fluorine-containing prepolymer (I) or between the fluorine-containing prepolymer (I) and a curing (crosslinking) agent to be added as case demands, for example, by contact with a radical or a cation, and thereby a cured (crosslinked) article can be provided.

The first of the preferred $Y^1$ is:

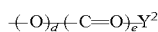

wherein $Y^2$ is an alkenyl group or fluorine-containing alkenyl group having 2 to 5 carbon atoms and an ethylenic carbon-carbon double bond at its end; d and e are the same or different and each is 0 or 1.

Example of preferred $Y^2$ is:

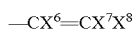

wherein $X^6$ is H, F, $CH_3$ or $CF_3$; $X^7$ and $X^8$ are the same or different and each is H or F. This group is preferred because of a high curing reactivity by contact with a radical or a cation.

Examples of preferred $Y^2$ are:
—CH=CH$_2$, —CF=CH$_2$,

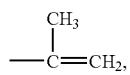

—CF=CF$_2$ and the like.

Also secondarily preferred $Y^1$ is:

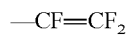

wherein $X^6$ is H, F, CH$_3$ or CF$_3$; $X^7$ and $X^8$ are the same or different and each is H or F. This group is preferred because a curing reactivity by contact with a radical is high and a cured article can be obtained easily by photo-curing or the like.

Examples of the secondarily preferred $Y^1$ are:

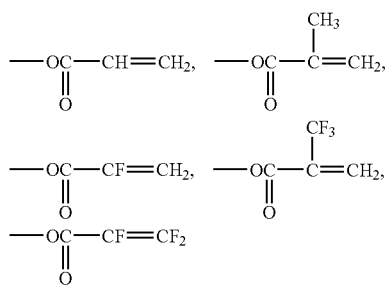

and the like.

Examples of other preferred $Y^1$ are:
—CH=CH$_2$, —CH$_2$CH=CH$_2$, —OCH$_2$CH=CH$_2$, —OCH=CH$_2$, —OCF=CF$_2$,

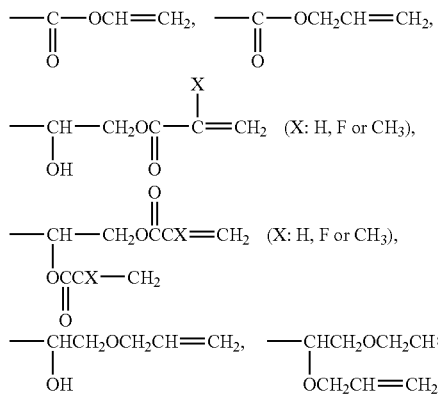

and the like.

Among the $Y^1$, those which have the structure of —O(C=O)CF=CH$_2$ is preferred because near infrared transparency can be made high, a curing (crosslinking) reactivity is particularly high and a cured article can be obtained efficiently.

The above-mentioned organic group $Y^1$ having a carbon-carbon double bond in its side chain may be introduced to an end of the polymer trunk chain.

In the fluorine-containing prepolymer (I) which is used in the present invention, —Rf— contained in the structural units M, M1, M2 and M3 is a fluorine-containing alkylene group having 1 to 40 carbon atoms or a fluorine-containing alkylene group having 2 to 100 carbon atoms and ether bond. This Rf group may be one in which fluorine atom is bonded to carbon atom contained therein. The Rf group is generally a fluorine-containing alkylene group or fluorine-containing alkylene group having ether bond in which fluorine atom and hydrogen atom or chlorine atom are bonded to carbon atom. Preferred Rf group is one having more fluorine atoms (a high fluorine content). More preferred is a perfluoroalkylene group or a perfluoroalkylene group having ether bond. The fluorine content in the fluorine-containing prepolymer (I) is not less than 25% by weight, preferably not less than 40% by weight. Such a fluorine content is preferred because near infrared transparency of the fluorine-containing prepolymer (I) can be made high and also a high near infrared transparency can be maintained even if a curing degree (crosslinking density) is increased particularly to increase heat resistance and elasticity of a cured article.

Too large number of carbon atoms of —Rf— is not preferred because there is a case where solubility in a solvent is lowered and transparency is lowered in case of a fluorine-containing alkylene group, and because a hardness and mechanical properties of the polymer itself and the cured article are lowered in case of a fluorine-containing-alkylene group having ether bond. The number of carbon atoms of the fluorine-containing alkylene group is preferably from 1 to 20, more preferably from 1 to 10. The number of carbon atoms of the fluorine-containing alkylene group having ether bond is preferably from 2 to 30, more preferably from 2 to 20.

Preferred examples of Rf are:

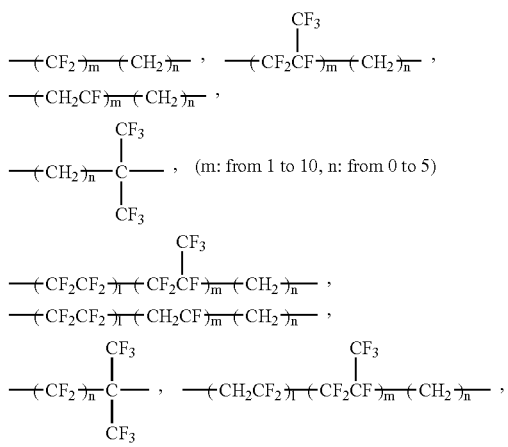

(l: from 1 to 10, m: from 1 to 10, n: from 0 to 5)

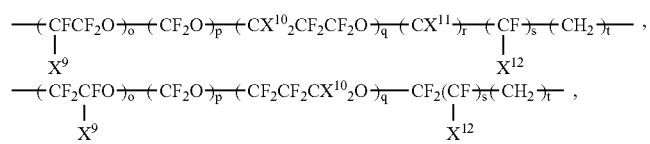

($X^9$ and $X^{12}$ are F or $CF_3$; $X^{10}$ and $X^{11}$ are H or F; o+p+q is from 1 to 30; r is 0 or 1; s and t are 0 or 1)

and the like.

As mentioned above, the structural unit M constituting the fluorine-containing prepolymer (I) of the present invention is preferably the structural unit M1 and the structural unit M1 is further preferably the structural units M2 and M3. Next, mentioned below are examples of the structural units M2 and M3.

Preferred examples of the monomer constituting the structural unit M2 are:

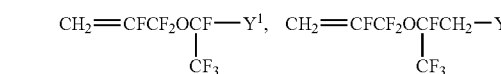
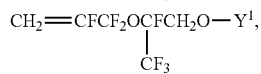
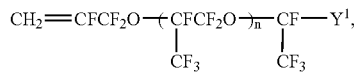
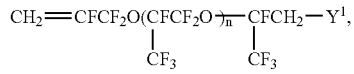
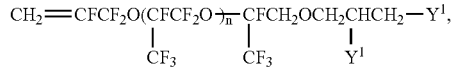
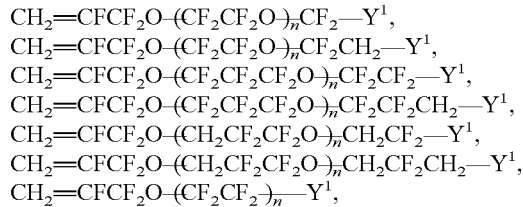

(n: an integer of from 1 to 30)

and the like.

More concretely there are:

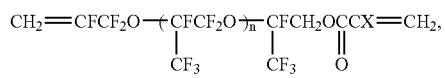

(X: H, $CH_3$, F or $CF_3$, n: 0 or an integer of from 1 to 30)

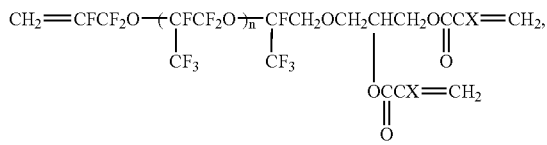

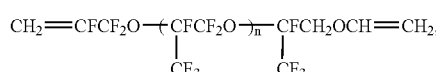
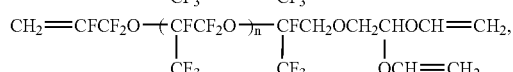

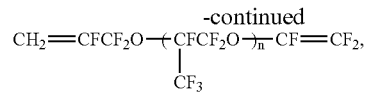

(n: 0 or an integer of from 1 to 30)

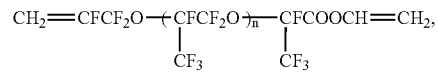
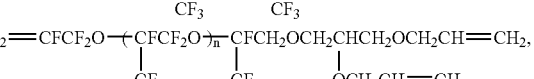

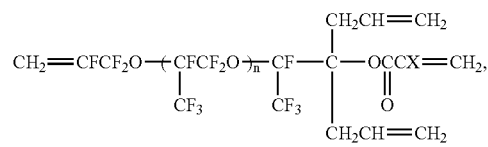

($Rf^1$ and $Rf^2$ are perfluoroalkyl groups having 1 to 5 carbon atoms; n is 0 or an integer of from 1 to 30)

(X is H, $CH_3$, F or $CF_3$, n is 0 or an integer of from 1 to 30)

and the like.

Preferred examples of the monomer constituting the structural unit M3 are:

$CF_2=CFOCF_2CF_2—Y^1$, $CF_2=CFOCF_2CF_2CH_2—Y^1$,

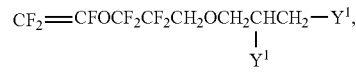
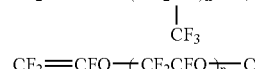
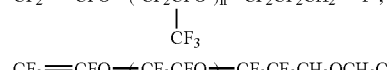
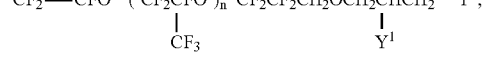

(n is an integer of from 1 to 30)

$CF_2=CFO—(CF_2—)_3Y^1$, $CF_2=CFO—(CF_2—)_3CH_2—Y^1$,
$CF_2=CFOCF_2CF_2OCF_2—Y^1$,
$CF_2=CFOCF_2CF_2OCF_2CH_2—Y^1$,

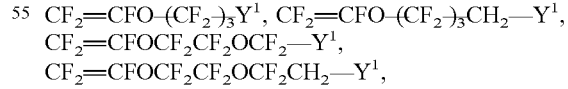

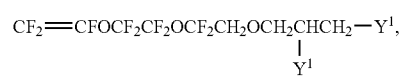
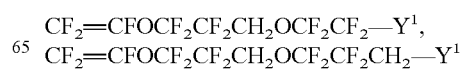

and the like.

More concretely there are:

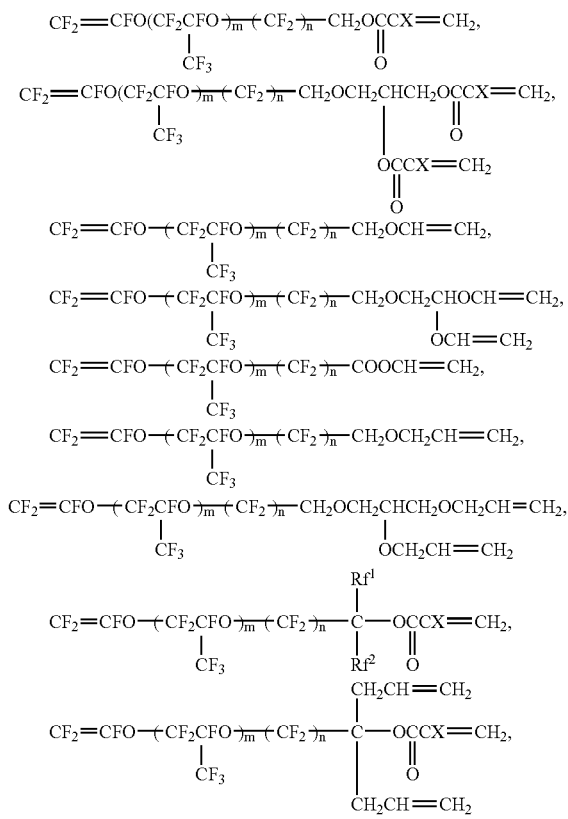

(m is 0 or an integer of from 1 to 30; n is an integer of from 1 to 3; X is H, $CH_3$, F or $CF_3$; $Rf^1$ and $Rf^2$ are perfluoroalkyl groups having 1 to 5 carbon atoms;)

and the like.

Preferred examples of the monomer constituting the structural unit M of the fluorine-containing prepolymer (I) other than the above-mentioned structural units M2 and M3 are, for instance,

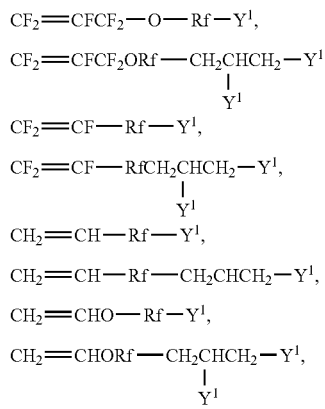

and the like, wherein Rf is as defined above.

More concretely there are:
$CF_2=CFCF_2OCF_2CF_2CF_2-Y^1$,
$CF_2=CFCF_2OCF_2CF_2CF_2CH_2-Y^1$,

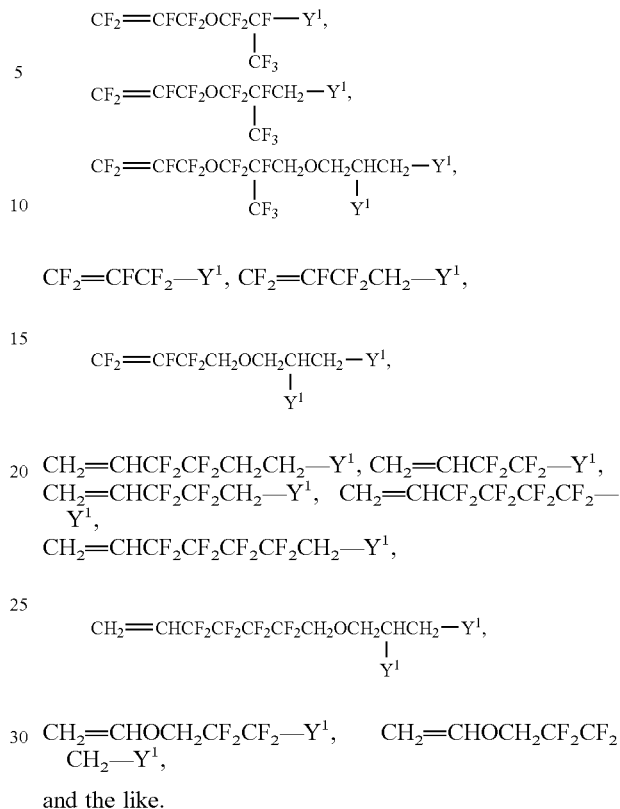

$CF_2=CFCF_2-Y^1$, $CF_2=CFCF_2CH_2-Y^1$, $CF_2=CFCF_2CH_2OCH_2CHCH_2-Y^1$,
                                  |
                                  $Y^1$ $CH_2=CHCF_2CF_2CH_2CH_2-Y^1$, $CH_2=CHCF_2CF_2-Y^1$,
$CH_2=CHCF_2CF_2CH_2-Y^1$, $CH_2=CHCF_2CF_2CF_2CF_2-Y^1$,
$CH_2=CHCF_2CF_2CF_2CF_2CH_2-Y^1$, $CH_2=CHCF_2CF_2CF_2CF_2CH_2OCH_2CHCH_2-Y^1$,
                                              |
                                              $Y^1$ $CH_2=CHOCH_2CF_2CF_2-Y^1$, $CH_2=CHOCH_2CF_2CF_2CH_2-Y^1$, and the like.

In the fluorine-containing prepolymer (I) of the present invention, the structural unit A is an optional component. The structural unit A is not limited particularly as far as it is a monomer copolymerizable with the structural units M, M1, M2 and M3. The structural unit A may be optionally selected depending on intended applications of the fluorine-containing prepolymer (I) and the cured article obtained therefrom and required characteristics thereof.

Examples of the structural unit A are, for instance, as follows.

(i) Structural Units Derived from Fluorine-containing Ethylenic Monomers Having Functional Group These structural units (i) are preferred from the point that adhesion to a substrate and solubility in a solvent, particularly in a general-purpose solvent can be imparted to the fluorine-containing prepolymer (I) and the cured article obtained therefrom while maintaining high near infrared transparency thereof, and is also preferred from the point that other functions such as crosslinkability than those affected by $Y^1$ can be imparted.

Preferred structural unit (i) of the fluorine-containing ethylenic monomer having functional group is a structural unit represented by the formula (4):

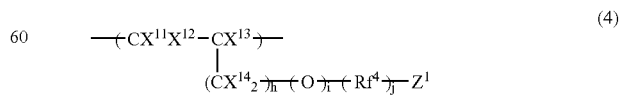
(4)

wherein $X^{11}$, $X^{12}$ and $X^{13}$ are the same or different and each is H or F; $X^{14}$ is H, F or $CF_3$; h is 0, 1 or 2; i and j are the same or different and each is 0 or 1; $Rf^4$ is a fluorine-containing alkylene group having 1 to 40 carbon atoms or a fluorine-containing alkylene group having 2 to 100 carbon atoms and ether bond; $Z^1$ is a functional group selected from the group consisting of —OH, $CH_2OH$, —COOH, carboxylic acid derivative, —$SO_3H$, sulfonic acid derivative, epoxy and cyano, and particularly preferred is a structural unit derived from:

$$CH_2\!=\!CFCF_2ORf^4\!-\!Z^1$$

wherein $Rf^4$ and $Z^1$ are as defined above.

More concretely there are preferably structural units derived from fluorine-containing ethylenic monomers such as:

$$CH_2\!=\!CFCF_2OCF\!-\!Z^1,$$
$$\quad\quad\quad\quad\quad\;\;|$$
$$\quad\quad\quad\quad\;\;CF_3$$

$$CH_2\!=\!CFCF_2OCFCF_2OCF\!-\!Z^1,$$
$$\quad\quad\quad\quad\quad\;\;|\quad\quad\quad\;|$$
$$\quad\quad\quad\quad\;\;CF_3\quad\;\;CF_3$$

$$CH_2\!=\!CFCF_2O\!-\!(CFCF_2O)_2\!-\!CF\!-\!Z^1,$$
$$\quad\quad\quad\quad\quad\;\;\;\;|\quad\quad\quad\quad\;|$$
$$\quad\quad\quad\quad\;\;\;\;CF_3\quad\quad\;CF_3$$

$$CH_2\!=\!CFCF_2OCH_2CF_2\!-\!Z^1,$$

$$CH_2\!=\!CFCF_2OCH_2CF_2CF_2OCF\!-\!Z^1,$$
$$\quad\quad\quad\quad\quad\quad\quad\quad\quad\quad\;\;|$$
$$\quad\quad\quad\quad\quad\quad\quad\quad\quad\;CF_3$$

$CH_2\!=\!CFCF_2OCF_2CF_2OCF_2\!-\!Z^1$ and
$CH_2\!=\!CFCF_2O\!-\!(CF_2CF_2O)_2CF_2\!-\!Z^1$ wherein $Z^1$ is as defined above.

Also there are preferred structural units derived from monomers represented by:
$CF_2\!=\!CFORf^4\!-\!Z^1$ wherein $Rf^4$ and $Z^1$ are as defined above. More concretely there are structural units derived from monomers such as:
$CF_2\!=\!CFOCF_2CF_2\!-\!Z^1$, $CF_2\!=\!CFOCF_2CF_2CH_2\!-\!Z^1$, $$CF_2\!=\!CFOCF_2CFOCF_2CF_2\!-\!Z^1,$$
$$\quad\quad\quad\quad\quad\;\;|$$
$$\quad\quad\quad\quad\;CF_3$$

$$CF_2\!=\!CFOCF_2CFOCF_2CF_2CH_2\!-\!Z^1,$$
$$\quad\quad\quad\quad\quad\;\;|$$
$$\quad\quad\quad\quad\;CF_3$$

$CF_2\!=\!CFO\!-\!(CF_2)_3Z^1$, $CF_2\!=\!CFO\!-\!(CF_2)_3CH_2\!-\!Z^1$,
$CF_2\!=\!CFOCF_2CF_2OCF_2\!-\!Z^1$,
$CF_2\!=\!CFOCF_2CF_2OCF_2CH_2\!-\!Z^1$,
$CF_2\!=\!CFOCF_2CF_2CH_2OCF_2CF_2\!-\!Z^1$ and
$CF_2\!=\!CFOCF_2CF_2CH_2OCF_2CF_2CH_2\!-\!Z^1$, wherein $Z^1$ is as defined above.

Examples of the other fluorine-containing ethylenic monomer having functional group are:
$CF_2\!=\!CFCF_2\!-\!O\!-\!Rf\!-\!Z^1$, $CF_2\!=\!CF\!-\!Rf\!-\!Z^1$,
$CH_2\!=\!CH\!-\!Rf\!-\!Z^1$, $CH_2\!=\!CHO\!-\!Rf\!-\!Z^1$, and the like, wherein Rf is the same as the above-mentioned Rf of the formula (M). More concretely there are:
$CF_2\!=\!CFCF_2OCF_2CF_2\!-\!Z^1$,
$CF_2\!=\!CFCF_2OCF_2CF_2CH_2\!-\!Z^1$, $$CF_2\!=\!CFCF_2OCF_2CF\!-\!Z^1,$$
$$\quad\quad\quad\quad\quad\quad|$$
$$\quad\quad\quad\quad\;CF_3$$

-continued
$$CF_2\!=\!CFCF_2OCF_2CF\!-\!CH_2\!-\!Z^1,$$
$$\quad\quad\quad\quad\quad\quad|$$
$$\quad\quad\quad\quad\;CF_3$$

$CF_2\!=\!CFCF_2\!-\!Z^1$, $CF_2\!=\!CFCF_2CH_2\!-\!Z^1$,
$CH_2\!=\!CHCF_2OF_2CH_2CH_2\!-\!Z^1$, $CH_2\!=\!CHCF_2CF_2\!-\!Z^1$,
$CH_2\!=\!CHCF_2CF_2CH_2\!-\!Z^1$, $CH_2\!=\!CHCF_2CF_2CF_2CF_2\!-\!Z^1$,
$CH_2\!=\!CHCF_2CF_2CF_2CH_2\!-\!Z^1$, $CH_2\!=\!CHO\!-\!CH_2CF_2CF_2\!-\!Z^1$,
$CH_2\!=\!CHOCH_2CF_2CF_2CH_2\!-\!Z^1$ and the like, wherein $Z^1$ is as defined above.

When using the monomer having —OH group, —COOH group or —$SO_3H$ group, it is preferable that an amount thereof is within the limit of not lowering near infrared transparency.

(ii) Structural Units Derived from Fluorine-Containing Ethylenic Monomers Having No Functional Group These structural units (ii) are preferred from the point that a higher near infrared transparency of the fluorine-containing prepolymer (I) and the cured article obtained therefrom can be maintained and transparency can be further increased. Also these structural units are preferred from the point that by selecting the monomer, mechanical properties and glass transition temperature of the polymer can be adjusted, particularly the glass transition temperature can be increased by copolymerization with the structural unit M.

Examples of the preferred structural units (ii) of the fluorine-containing ethylenic monomer are those represented by the formula (5):

$$-\!(CX^{15}X^{16}\!-\!CX^{17})\!- \quad\quad\quad\quad (5)$$
$$\quad\quad\quad\quad|$$
$$(CX^{18}_2)_{h1}\!(O)_{i1}\!(Rf^5)_{j1}\!Z^2$$

wherein $X^{15}$, $X^{16}$ and $X^{18}$ are the same or different and each is H or F; $X^{17}$ is H, F or $CF_3$; h1, i1 and j1 are 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond.

Examples thereof are preferably structural units derived from monomers such as:
$CF_2\!=\!CF_2$, $CF_2\!=\!CH_2$, $CF_2\!=\!CFCl$, $CF_2\!=\!CFCF_3$, $$\quad\quad\quad\quad\;CF_3$$
$$\quad\quad\quad\quad/$$
$$CF_2\!=\!C$$
$$\quad\quad\quad\quad\backslash$$
$$\quad\quad\quad\quad\;CF_3,$$

$CF_2\!=\!CFO(CF_2)_nF$ (n: from 1 to 5), $CH_2\!=\!C(CF_3)_2$,
$CF_2\!=\!CFH$, $CF_2\!=\!CCl_2$, $$CF_2\!=\!CFOCF_2CFO\!-\!C_3F_7,$$
$$\quad\quad\quad\quad\quad\quad\;|$$
$$\quad\quad\quad\quad\;CF_3$$

$CH_2\!=\!CF\!-\!(CF_2)_nZ^2$ ($Z^2$ is as defined in the formula (5), n is from 1 to 10) and
$CH_2\!=\!CHOCH_2\!-\!(CF_2)_nZ^2$ ($Z^2$ is as defined in the formula (5), n is from 1 to 10)

(iii) Fluorine-containing Aliphatic Ring Structural Units

Introduction of these structural units (iii) is preferred since transparency can be increased, a near infrared transparency can be increased more and further since the fluorine-containing prepolymer (I) having a high glass transition temperature can be obtained and a higher hardness of the cured article can be expected.

Examples of the preferred fluorine-containing aliphatic ring structural unit (iii) are those represented by the formula (6):

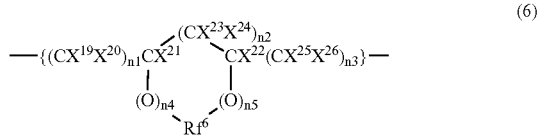

(6)

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^6$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

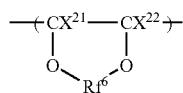

wherein $Rf^6$, $X^{21}$ and $X^{22}$ are as defined above.

Concretely there are:

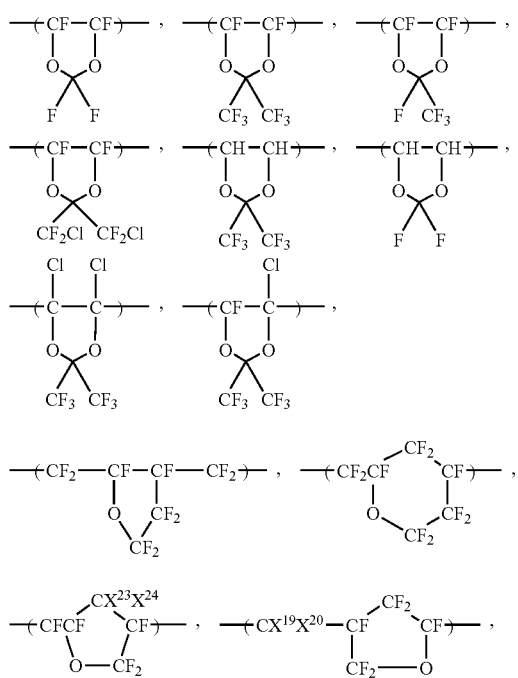

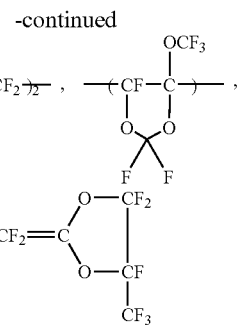

and the like wherein $X^{19}$, $X^{20}$, $X^{23}$ and $X^{24}$ are as defined above.

(iv) Structural Units Derived from Ethylenic Monomers Having no Fluorine

The structural units (iv) derived from ethylenic monomers having no fluorine may be introduced to the polymer within the limit of not having an adverse effect on near infrared transparency.

The introduction of those structural units (iv) can enhance solubility in a general-purpose solvent and can improve compatibility with additives, for example, a photocatalyst and a curing agent to be added as case demands.

Examples of the non-fluorine-containing ethylenic monomer are as follows.

α-Olefins:

Ethylene, propylene, butene, vinyl chloride, vinylidene chloride and the like.

Vinyl ether or vinyl ester monomers:

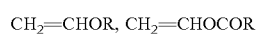

(R: hydrocarbon group having 1 to 20 carbon atoms) and the like.

Allyl monomers:

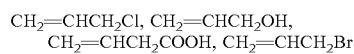

and the like.

Allyl ether monomers:

(R: hydrocarbon group having 1 to 20 carbon atoms),

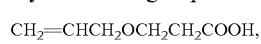

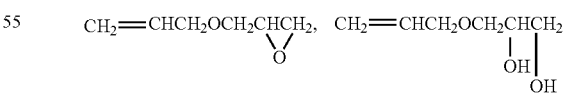

and the like.

Acrylic or methacrylic monomers:

Acrylic acid, methacrylic acid, acrylic acid esters, methacrylic acid esters, maleic anhydride, maleic acid, maleic acid esters and the like.

Monomers obtained by replacing a part or the whole of hydrogen atoms of the above-mentioned non-fluorine-containing monomers with heavy hydrogen atoms are more preferred from the viewpoint of transparency.

(v) Structural Units Derived from Alicyclic Monomers

A structural unit (v) of an alicyclic monomer may be introduced as a component copolymerizable with the structural unit M, more preferably as the third component in addition to the structural unit M and the structural unit of the above-mentioned fluorine-containing ethylenic monomer or non-fluorine-containing ethylenic monomer (the above-mentioned (iii) or (iv), respectively), which makes a glass transition temperature and hardness high.

Examples of the alicyclic monomer (v) are norbornene derivatives represented by:

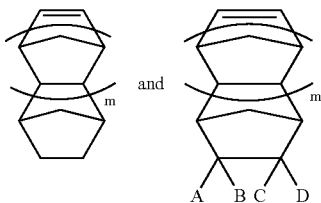

wherein m is 0 or an integer of from 1 to 3; A, B, C and D are the same or different and each is H, F, Cl, COOH, $CH_2OH$, a perfluoroalkyl group having 1 to 5 carbon atoms or the like, alicyclic monomers such as:

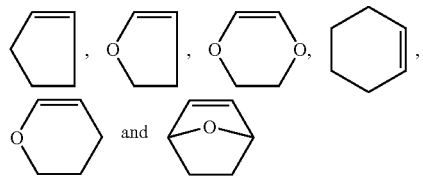

and derivatives thereof to which a substituent is introduced.

In the fluorine-containing prepolymer (I) of the present invention, various combinations and proportions of the structural units M (M1, M2 or M3) and A can be selected from the above-mentioned examples depending on intended applications, physical properties (particularly glass transition temperature, hardness, etc.), functions (transparency and near infrared transparency) and the like as far as the combination of the structural units M and A makes the polymer non-crystalline and the fluorine content becomes not less than 25% by weight.

The fluorine-containing prepolymer (I) contains the structural unit M (M1, M2 or M3) as an essential component and has functions due to the structural unit M itself such as maintaining a high near infrared transparency, imparting transparency and being capable of imparting hardness, heat resistance, abrasion resistance, scratch resistance and solvent resistance to a cured article by curing. Also the fluorine-containing prepolymer has a characteristic that a refractive index can be controlled by adjusting the content of the structural unit M. Therefore even if the fluorine-containing prepolymer (I) contains a larger amount of the structural unit M or in the extreme case, even if the prepolymer consists of the structural unit M (100% by mole), a high near infrared transparency can be maintained. Further a cured article having a high curing (crosslinking) density can be obtained and a coating film having a high hardness and excellent abrasion resistance, scratch resistance and heat resistance can be obtained.

Also in the case of the copolymer comprising the structural unit M and the structural unit A of the fluorine-containing prepolymer (I), when the structural unit A is selected from the above-mentioned examples, there can be obtained the prepolymer providing a cured article having a higher hardness (a high glass transition temperature) and a high near infrared transparency.

In the copolymer comprising the structural unit M and the structural unit A of the fluorine-containing prepolymer (I), the proportion of the structural unit M may be not less than 0.1% by mole based on the whole structural units constituting the fluorine-containing prepolymer (I). The proportion is not less than 2.0% by mole, preferably not less than 5% by mole, more preferably not less than 10% by mole in order to obtain the cured article having a high hardness, excellent abrasion resistance and scratch resistance and good chemical resistance and solvent resistance by curing (crosslinking).

Particularly for the optical waveguide device applications which require formation of a cured coating film having excellent heat resistance and transparency and small moisture absorption, it is preferable that the structural unit M is contained in an amount of not less than 10% by mole, more preferably not less than 20% by mole, further preferably not less than 50% by mole.

The curable fluorine-containing prepolymer (I) of the present invention has preferable characteristics particularly for the nonlinear optical material applications in a near infrared region since transparency is not lowered even if the proportion of the structural unit M is increased (or even if the number of cure sites is increased).

In the case where the curable fluorine-containing prepolymer (I) is used as a nonlinear optical material for optical functional device used in optical communication, a high transparency is required and it is important that the prepolymer (I) has a combination and proportion of the structural units M and A which make the prepolymer non-crystalline. Being non-crystalline means that when in DSC analysis, measurement is carried out at a temperature increasing rate of 10° C./min, an absorption peak of melting is not substantially observed or heat of fusion is 1 J/g or lower at the 2nd run.

It is preferable that the fluorine content of the curable fluorine-containing prepolymer (I) is not less than 25% by weight.

If the fluorine content is low, transparency in a near infrared region is lowered. Also if the fluorine content is low, moisture absorption is increased and therefore the prepolymer cannot be used substantially as an optical material. For the nonlinear optical material applications, most preferable fluorine content is not less than 40% by weight.

As a method of measuring a fluorine content, generally there is used a method of calculating the fluorine content by analyzing components of a polymer from measurements with $^{19}F$-NMR and $^1H$-NMR. When it is difficult to analyze a polymer structure by the above-mentioned method, there is used a method of elementary analysis of fluorine in which 2 mg of a sample and a combustion improver (10 mg of sodium peroxide) are wrapped with a filter paper (filter paper No.7 available from Toyo Roshi), are put in a platinum basket and then are burned in a 500 ml flask filled with 25 ml of pure water. Immediately after the burning, the flask is shaken to absorb fluorine ion in pure water and then fluorine ion absorbed in pure water is analyzed with a fluorine ion electrode (fluorine ion meter model 901 available from Orion Research).

It is preferable that the curable fluorine-containing prepolymer (I) of the present invention has a maximum absorption coefficient of not more than 1 cm$^{-1}$ in specific wavelength ranges (from 1,290 to 1,320 nm and/or from 1,530 to 1,570 nm and/or from 600 to 900 nm). If the absorption coefficient is higher than that, the prepolymer is not suitable as a nonlinear optical material used in optical communication.

The molecular weight of the fluorine-containing prepolymer (I) can be selected, for example, in a range of from 500 to 1,000,000 in number average molecular weight, and is preferably from 1,000 to 500,000, particularly preferably from 2,000 to 200,000.

If the molecular weight is too low, mechanical properties are apt to be insufficient even after the curing, and particularly a cured article and a cured coating film are apt to be fragile and insufficient in strength. If the molecular weight is too high, solubility in a solvent is lowered, particularly film forming property and leveling property are apt to be lowered at forming a thin film and storage stability of the fluorine-containing prepolymer is apt to be unstable. For optical waveguide applications, most preferable molecular weight is selected in a range of from 5,000 to 100,000 in number average molecular weight.

It is preferable that the fluorine-containing prepolymer (I) itself (before curing) has a maximum absorption coefficient of not more than 1 cm$^{-1}$, more preferably not more than 0.5 cm$^{-1}$, particularly preferably not more than 0.1 cm$^{-1}$ in the wavelength range of from 1,290 to 1,320 nm, from 1,530 to 1,570 nm or from 600 to 900 nm and further has a refractive index in nd of from 1.3 to 1.7. Adjustments thereof can be made by determining various kinds and contents of the structural unit M and kind of the structural unit A to be used as case demands and make selection of a clad easy when forming the waveguide.

Further it is preferable that the fluorine-containing prepolymer is soluble in general-purpose solvents, for example, in at least one of ketone solvents, acetic acid ester solvents, alcohol solvents and aromatic solvents or in solvent mixtures containing at least one of the above-mentioned general-purpose solvents.

When the prepolymer is soluble in general-purpose solvents, it is preferable because film forming property and homogeneity are excellent particularly when it is necessary to form a thin coating film of about 3 μm in a process for forming an optical waveguide, and also it is advantageous from the viewpoint of productivity in forming an optical waveguide.

Being soluble in a solvent according to the present invention means that the fluorine-containing prepolymer is soluble in a solvent in an amount of 10 mg/g, preferably 20 mg/g, more preferably 50 mg/g.

In order to obtain the fluorine-containing prepolymer (I) of the present invention, generally any of:
(i) a method of previously synthesizing a monomer having Y$^1$ and then polymerizing the monomer,
(ii) a method of once synthesizing a polymer having another functional group and then converting the functional group by high molecular reaction, thus introducing the functional group Y$^1$ to the polymer, or the like method can be employed.

The organic compound which is another component of the fluorine-containing resin composition of the present invention and exhibits a second- or higher-order nonlinear optical effect (hereinafter simply referred to as "nonlinear substance") is blended to undergo a function of imparting the nonlinear optical effect to the resin composition.

The nonlinear optical effect means an optical effect arising as a result of a nonlinear polarization becoming not ignorable in a polarization of atom or molecule which is induced by a strong external electric field. For example, Pockels effect, parametric oscillation, second harmonic generation (SHG), etc. are known in a second-order nonlinear optical effect, and Kerr effect, electrostatic induction SHG, third harmonic generation (THG), change in a refractive index due to optical intensity, etc. are known in a third-order nonlinear optical effect. The second-order nonlinear optical effect can be applied on a wavelength conversion (SHG) device, electro-optical modulator, etc. and the third-order nonlinear optical effect can be applied on a wavelength conversion (THG) device, optical computing by high speed optical shutter, optical bistability device, optical switching, etc.

Examples of the nonlinear substance which is used in the present invention are organic substances having the following chemical structures.

(i) Aniline Derivatives 2-Methyl-4-nitroaniline (MNA), 4-nitroaniline, 2-nitroaniline, 3-nitroaniline, 2-methyl-4-nitro-N-methylaniline, 4-nitro-N-cyanomethylaniline, N,N-dimethyl-4-nitroaniline, 2,4-dinitroaniline, 2-chloro-4-nitroaniline, 2-bromo-4-nitroaniline, 4-nitro-2-(N-acetyl) amino-N,N-dimethylaniline, 4-fluoronitroaniline, 4-aminoacetophenone, N,N'-di(4-ethylcarboxyl)phenyl-methylenediamine and the like. These compounds have an amino group, and therefore compatibility and dispersibility can be expected and derivatives thereof can also be easily synthesized.

(ii) Urea and Enone Derivatives
Monomethylurea, sym-dimethylurea, tetramethylurea,

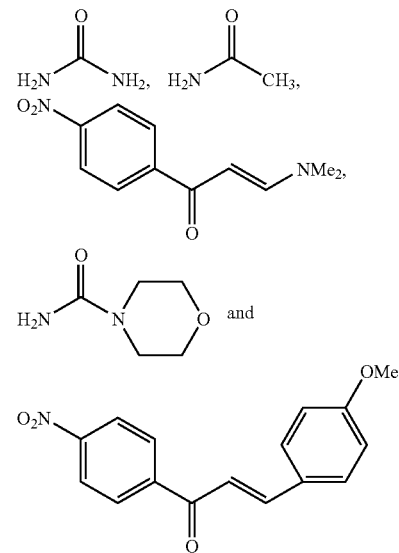

These compounds are preferred since transparency in visible light region is high.

(iii) Pyridine Derivatives
2-Amino-5-nitropyridine, 2-(N-cyclooctyl) amino-5-nitropyridine, 2-[1-(2-mthylol)pyrrolidinyl]-3-nitropyridine, 2-[N-(α-methylbenzyl)amino]-5-nitropyridine, 3-methyl-4- nitropyridineN-oxide, 4-[((1-methyl-4-(1H)-pyridinidene)ethylidene)2,5-cyclohexadiene-1-one, 4-N,N-dimethylaminopyridineN-oxide and the like.

These compounds are preferred since they have a small absorption edge and are transparent in a wide wavelength range.

(iv) Nitrobenzene Derivatives

4-[1-(2-methylol)pyrrolidinyl]-nitrobenzene, 2-fluoronitrobenzene, 4-[N-(2-hydroxyethyl)-N-ethylamino]-4'-nitroazobenzene (DR-1), 4-nitroanisol, 4-nitrotoluene, methyl-N-(2,4-dinitrophenyl)alaninate, 1-(4-nitrophenyl)-3,5-phenylpyrol, 4-N,N-dimethylamino-β-nitrostyrene and the like.

These compounds are preferred since various derivatives can be synthesized easily.

(v) Cyano Compounds

4-Cyanoaniline, 4-cyano-N,N-dimethylaniline, 4-cyanoanisole, 4-cyanotoluene and the like.

(vi) Conjugated Alkenylbenzene Derivatives

4-Nitro-trans-stilbene, 4-chloro-trans-stilbene, trans-4-azastilbene, 4-amino-trans-stilbene, 4-N,N-dimethylamino-trans-stilbene, 4-amino-4'-nitro-trans-stilbene, 4-N,N-dimethylamino-4'-nitro-trans-stilbene, 3-methyl-4-methoxy-4'-nitro-trans-stilbene, 4-methyl-4'-nitro-trans-stilbene, 4-chloro-4'-nitro-trans-stilbene, 4-methoxy-4'-cyano-trans-stilbene, 4-N,N-dimethylamino-4'-chloro-trans-stilbene, 4-N,N-dimethylamino-4'-azastilbeneN-oxide, 2-(2,2-dicyanovinyl)anisole (DIVA), 4'-nitrobenzylidene-3-acetoamino-4-methoxyaniline (MNBA), 4-N,N-dimethylaminocinnamaldehyde, 4-methoxycinnamaldehyde, 1-(4-N,N-dimethylaminophenyl)-4-nitrobuta-1,3-diene, 1-(4-cyanophenyl)-4-(4-N,N-dimethylaminophenyl)-buta-1,3-diene and the like.

These compounds are preferred since a large second-order nonlinear optical effect is exhibited.

(vii) Benzothiazole Derivatives 5

3-Ethyl-2-[2-(4-oxo-2,5-cyclohexadienylidene)ethylidene]-2,3-dihydrobenzothiazole, 2-[6-(4-carboxyphenylamino)cyclohexa-2,4-dienylidene]-3-ethyl-2,3-dihydroxybenzothiazole and the like.

(viii) N-containing Heterocyclic Ring 2-(4-cyanomethylene-cyclohexa-2,5-dienylidine)imidazolidine 2-(4-dicyanomethylene-cyclohexa-2,5-dienylidine)imidazolidine, 1-(4-nitrophenyl)-3,5-dimethylpyrazol (DMNP), N-methylmerocyanine, N-octadecylmerocyanine,

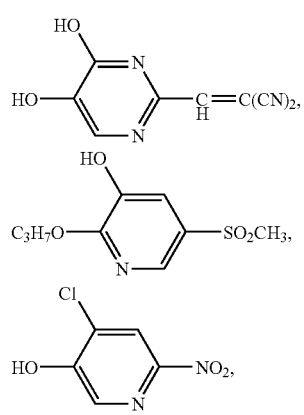

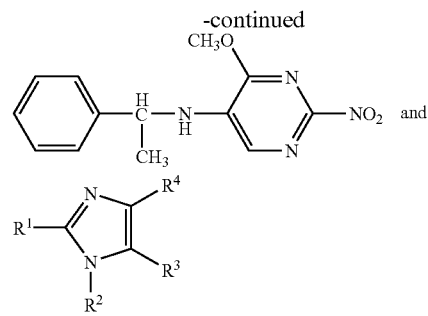

$R^1$ represents a heterocyclic group such as hydrogen atom, cyano or phenyl. $R^3$ and $R^4$ represent a heterocyclic group such as hydrogen atom, cyano or phenyl or a group of atoms constituting the ring formed by connected $R^3$ and $R^4$. There is no case that all of $R^1$, $R^3$ and $R^4$ are hydrogen atoms. $R^2$ represents hydrogen atom, alkyl or acyl.

These compounds are characterized by having a small absorption edge. Namely, the compounds are preferred because they are transparent in a wide wavelength range.

(ix) Charge-transfer Complex

Complex of tetramethyltetrathiafulvalene-cyanoethoxycarbonylmethylene and the like.

In addition to those structures, there are compounds having the following structures.

(1) Anthraquinone Compounds:

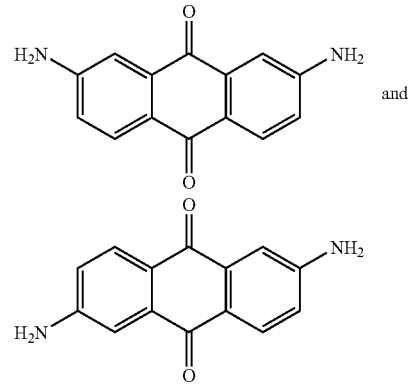

(2) L-pyroglutamic Acid Salts:

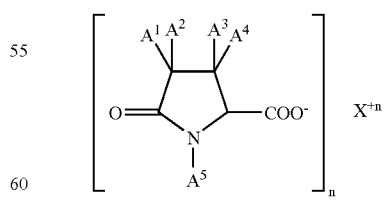

$A^1$, $A^2$, $A^3$, $A^4$ and $A^5$ represent hydrogen or heavy hydrogen, X represents hydrogen, heavy hydrogen, alkali metal or alkali earth metal and n represents 1 or 2.

Those compounds are preferred because of transparency in a wide wavelength range up to 250 nm.

(3) Amino Acid Derivatives:

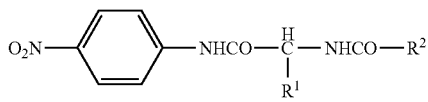

$R^1$ represents a linear or branched alkyl having 1 to 5 carbon atoms and $R^2$ represents alkyl having 10 to 20 carbon atoms.

(4) Dibenzoylmethane Derivatives:

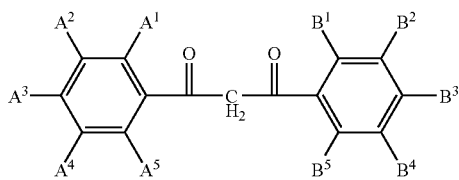

$A^1$, $A^2$, $A^3$, $A^4$, $A^5$, $B^1$, $B^2$, $B^3$, $B^4$ and $B^5$ represent any of hydrogen atom, fluorine atom, chlorine atom, alkyl, alkoxy, amino, alkylamino, nitro, cyano and dicyanoethylene.

These compounds are preferred because they have light absorption in a short wavelength range and transparency is exhibited in a wide wavelength range.

(5) Urocanic Acid Derivatives:

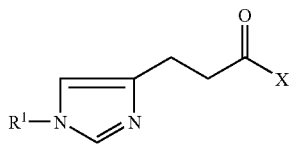

$R^1$ represents hydrogen, methyl or acetyl, X represents —O—$R^2$ or —N(—$R^4$)—$R^3$, in which $R^2$ represents hydrogen or alkyl having 1 to 18 carbon atoms, $R^3$ and $R^4$ represent hydrogen or alkyl having 1 to 18 carbon atoms.

These compounds are preferred because transparency is exhibited in a wide wavelength range.

(6) 1,3-Benzothiol Derivatives:

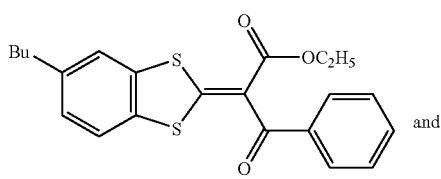

and

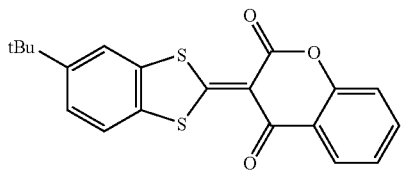

(7) Benzimidazole Derivatives:

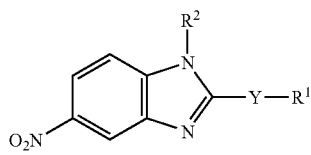

Y represents —$NR^3$— or —S—, and $R^1$, $R^2$ and $R^3$ represent hydrogen atom, alkyl or aryl and may be the same or different.

(8) 5-Benzylideneoxazolidine-2,4-dione Derivatives Having Asymmetric Carbon Atom:

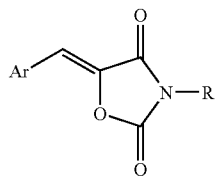

Ar represents phenyl subjected to replacement with an electron-donating group and R represents alkyl having asymmetric carbon atom.

These compounds are preferred since transmission of blue region is excellent.

(9) Nitroso-containing Compounds:

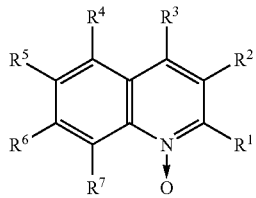

One of $R^1$ to $R^7$ represents an electron-donating group. The remaining substituents are hydrogen atoms or alkyl having 1 to 18 carbon atoms.

These compounds are also preferred since transmission of blue region is excellent.

(10) Hydrazine Derivatives:

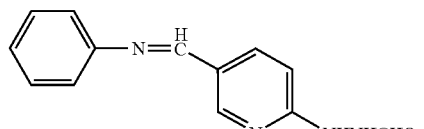

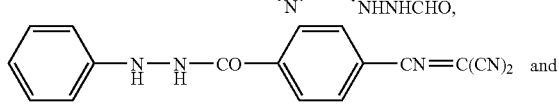

and

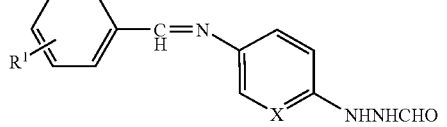

$R^1$ represents an electron-donating substituent or an electron-attracting substituent, and X represents CH or N atom.

(11) Hydrazone Derivatives:

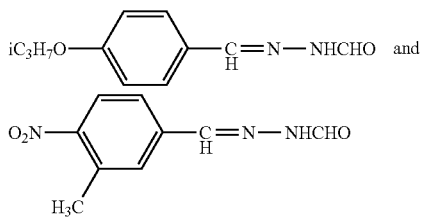

(12) Oxadiazole Derivatives:

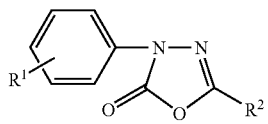

R¹ represents a substituent selected from amino, amide, alky, halogen atom and hydrogen atom, and R² represents alkyl or hydrogen atom.

Examples thereof are, for instance,

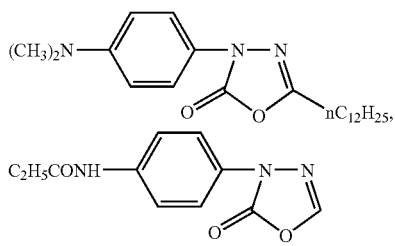

and the like.

(13) Stilbene Derivatives:

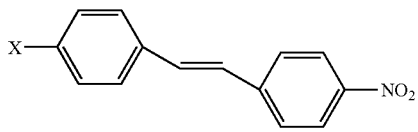

X represents halogen atoms such as chlorine, bromine, fluorine and iodine.

(14) Heterocyclic Compounds:

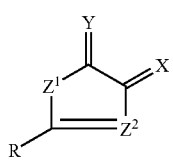

$Z^1$ represents O, S, Se, Te, $SO_2$ or $NR^1$. $Z^2$ represents N or $CR^2$. Y represents O, S or $NR^3$. X represents $CR^4R^5$, $NR^6$, O or S. R, $R^1$, $R^2$, $R^3$, $R^4$, $R^5$ and $R^6$ may be the same or different and represent a non-substituted or substituted heterocyclic group, aromatic hydrocarbon group, aliphatic hydrocarbon group or H atom. A hydrocarbon ring or a heterocyclic ring may be formed with $R^4$ and $R^5$.

Those compounds are preferred because of excellent transparency.

(15) 1,4-Diene-3-one Derivatives:

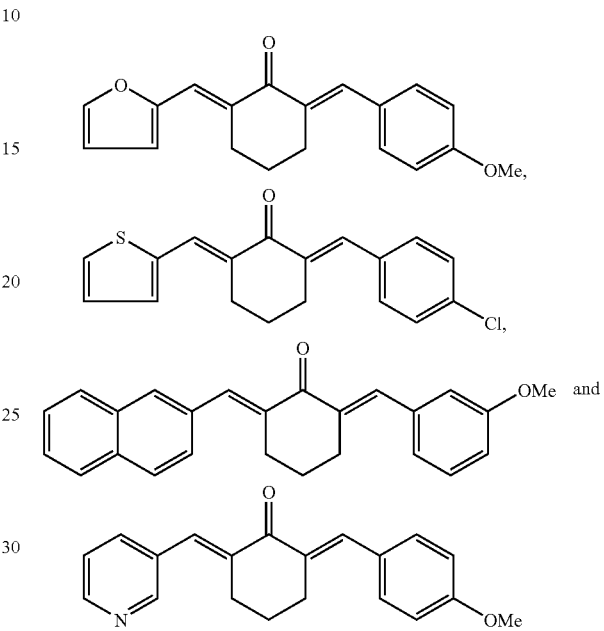

(16) Schiff Base Compounds:

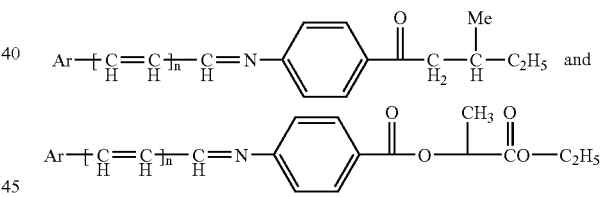

Ar represents a substituted or non-substituted aromatic group and n represents 0 or 1.

(17) Quinoline Compounds:

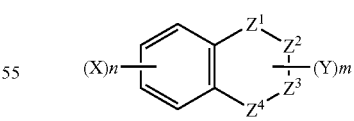

One or two of $Z^1$ to $Z^4$ represent nitrogen atom and the remainder represents carbon atom or a group represented by CH. X and Y are substituents selected from the group consisting of electron-attracting groups such as $-NO_2$, $-CH$, $-COR^1$, $-SO_2R^1$ and halogen atoms and electron-donating groups such as $-R^1$, $-NH_2$ and $-OR^2$ ($R^1$ and $R^2$ are alkyl having 1 to 18 carbon atoms) and may be the same or different. n is an integer of from 1 to 4, and m is an integer of from 1 to 3.

(18) Diketone Derivatives:

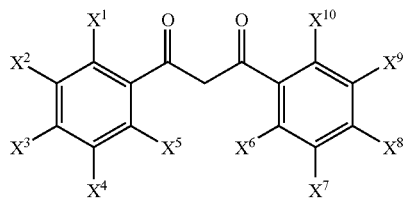

The substituents $X^1$ to $X^4$ are hydrogen or halogen, and $X^5$ is mercaptoalkoxy or alkoxy having 1 to 18 carbon atoms. Each of the substituents $X^6$ to $X^{10}$ is one selected from hydrogen, amino, substituted amino having from 1 to 12 carbon atoms, cyclic amino, alkyl having 1 to 18 carbon atoms, alkoxy having 1 to 18 carbon atoms, mercaptoalkoxy having 1 to 18 carbon atoms, cyano and halogen, and may be the same or different.

(19) Benzalacetofuran Derivatives:

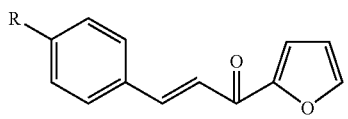

R represents $CH_3$, $CH_3S$, Br, CN or $NO_2$.
Stability of those compounds is high.

(20) 1-[2-(5-bromothienyl)]-3-(4'-substituted phenyl)-propen-3-one:

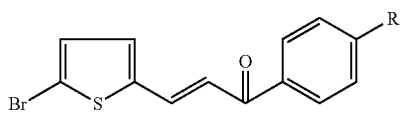

R represents $OCH_3$, $NH_2$, $NO_2$, Cl or Br.

(21) Compositions Comprising a Mixture of PNA or the like and other Compound:

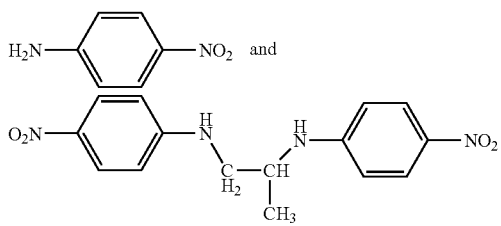

(22) Dioxy Ring-containing Compounds:

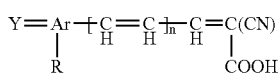

Y represents an ethylenedioxy group introduced to the site adjacent to Ar, R represents hydrogen atom or a hydrocarbon group having 1 to 8 carbon atoms, Ar represents an aromatic group having 5 to 14 carbon atoms and n represents 0, 1 or 2. The compounds contain a dioxy ring comprising an optically-active amine salt of carboxylic acid.

(23) Optically-active Amine Salt of Carboxylic Acid:

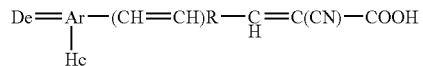

Ar represents an aromatic group having 5 to 14 carbon atoms, De represents methylenedioxy group having dioxy group introduced to the site adjacent to Ar, and Hc represents hydrogen atom of Ar or alkyl which has 1 to 8 carbon atoms and may be replaced. When two or more hydrogen atoms of Ar are replaced with alkyl, such alkyl may be the same or different. n represents 0, 1 or 2. The optically-active α-amino acid derivative comprises the optically-active amine salt of carboxylic acid, in which the optically-active amine has an optically-active α-amino acid, a carboxyl-substituted hydrocarbon ester group thereof having 1 to 20 carbon atoms or a primary or secondary amide of hydrocarbon.

(24) Condensed Polycyclic Aromatic Compounds:

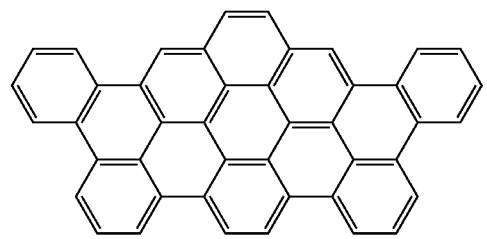

and

Those compounds exhibit a high third-order nonlinear optical effect and are preferred because of high durability against light and heat.

(25) Compounds Having Thiophene Ring or Furan Ring:

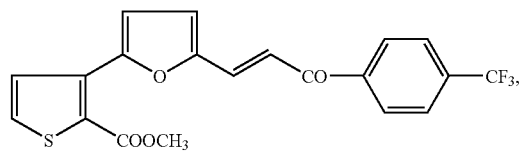

and

-continued

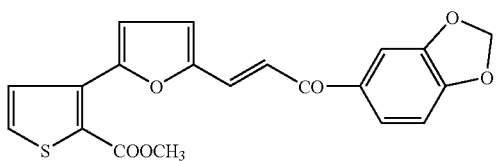

Those compounds are preferred because of a very high stability.

(26) Perfluoroalkyl-containing Compounds:

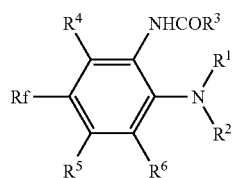

Rf is a perfluoroalkyl group represented by $C_nF_{2n+1}$, $R^1$, $R^2$ and $R^3$ are aliphatic hydrocarbon groups or aromatic hydrocarbon groups which may be substituted, and $R^4$, $R^5$ and $R^6$ are hydrogen atoms or optional substituents. $R^1$ and $R^2$ can be combined to form a ring structure.

Those compounds are preferred because of a high near infrared transparency.

(27) Benzothiazole Derivatives:

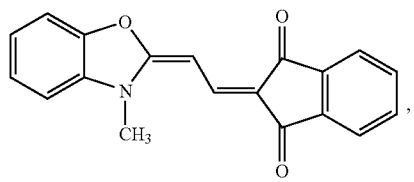

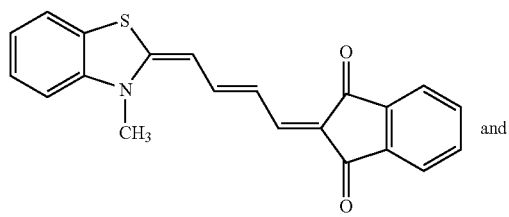

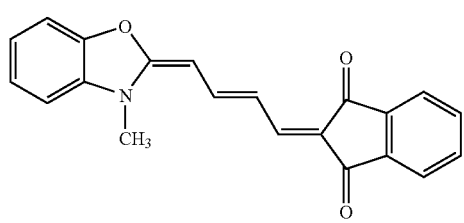

(28) Benzoaxazole Derivatives:

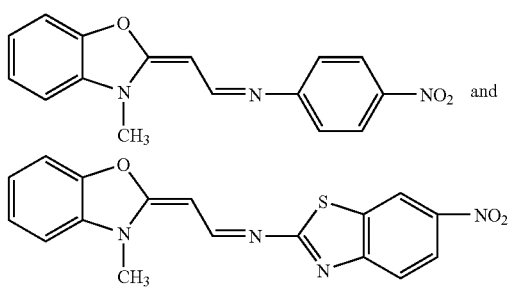

(29) Cyclic Alkylidene Ester Derivatives:

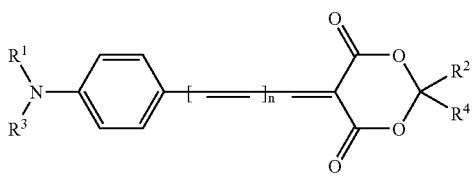

$R^1$, $R^2$, $R^3$ and $R^4$ represent hydrogen or alkyl having 1 to 3 carbon atoms, and n represents 0 or an integer of from 1 to 3.

(30) Diaminobenzene Derivatives:

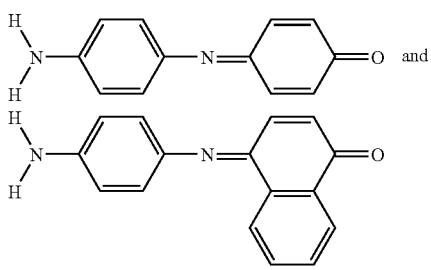

(31) Squarylium Derivatives:

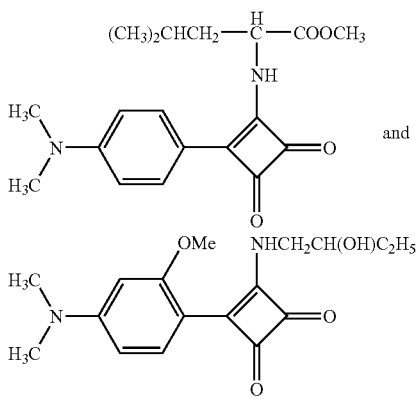

Those compounds are preferred because stability is high and a high nonlinear optical effect is exhibited.

(32) Anthraquinone Derivatives:

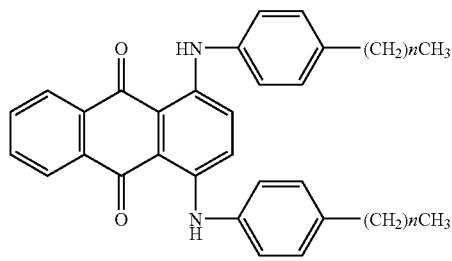

n is 0 or positive numbers.

Those derivatives are preferred because of high second-order and third-order nonlinear effects.

(33) Naphthalene Derivatives:

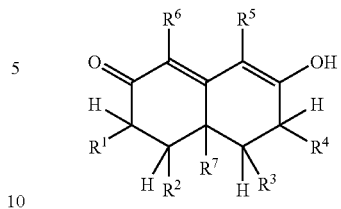

$R^1$ to $R^7$ may be the same or different and represent substituents selected from hydrogen atom, aromatic, alicyclic or aliphatic groups having 1 to 20 carbon atoms, acyl, amino, cyano, nitro, azo and halogen atoms.

(34) Phthalocyanine Compounds:

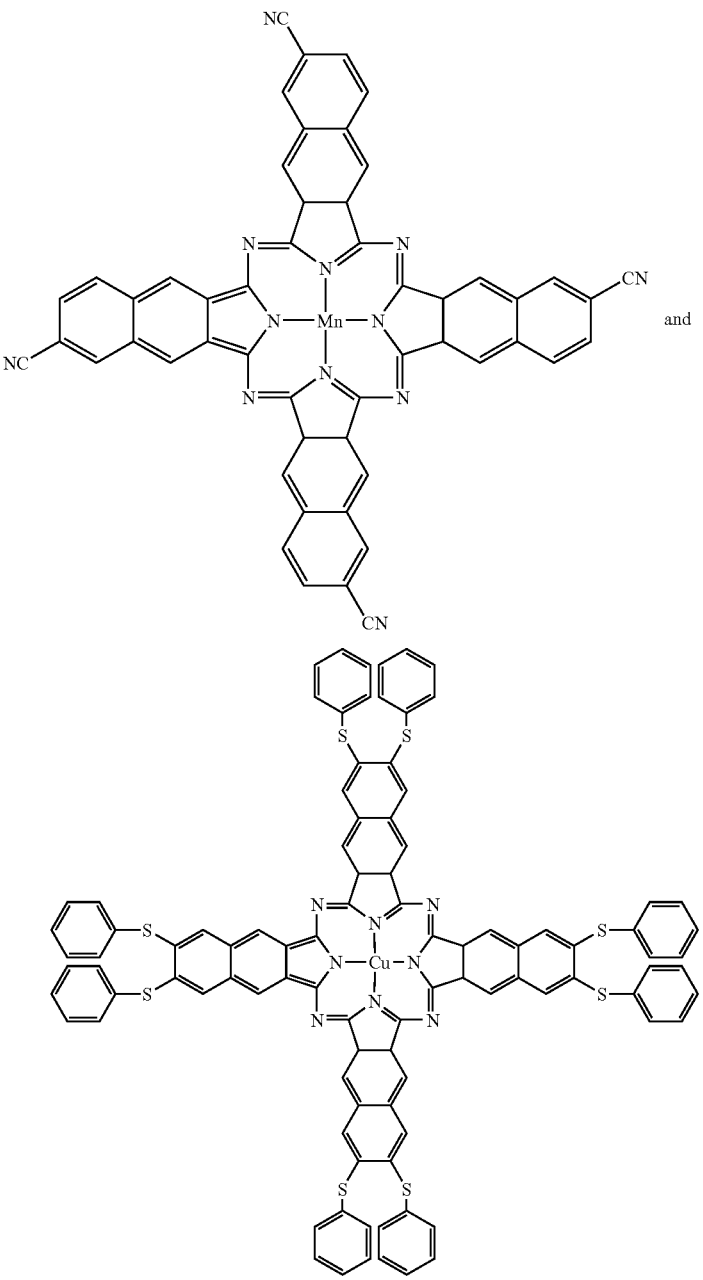

and

Those compounds are preferred because of a high third-order nonlinear optical effect.

In addition, there are 2-aminofluorene, α-cyano-o-ethoxyethyl cinnamate, α-cyano-o-methoxymethyl cinnamate, α-cyano-p-acetylaminoethyl cinnamate, α-cyano-p-acetylaminomethyl cinnamate, α-cyano-p-acetylamino n-butyl cinnamate, 1,3bis-(3,4-dimethoxystyryl)benzene, 4-[2-(4-nitrophenyl)ethenyl]benzaldehyde, N-methoxymethyl-4-nitroaniline, N-N'-bis-(4-nitrophenyl)-methanediamine, p-toluenesulfonate-1-methyl-4-[2-(4-N,N-dimethylaminophenyl)vinyl]pyridinium, 3,9-dinitro-5a,6,11a,12-tetrahydro-[1,4]benzoxadino[3,2-b][1,4]benzoxadine, 1-nitropropylene, 1,3-dithienylpropenone, inclusion complex of 4,5-bis(4-methoxyphenyl)-2-(3-nitrophenyl)-1H-imidazole and benzene and the like.

Among those compounds, preferred are aniline derivatives, urea and enone derivatives and hydroxyl- or amide-containing compounds from the viewpoint of compatibility. From the viewpoint of compatibility, also preferred are derivatives of the above-mentioned compounds in which a part or the whole thereof are replaced with fluorine within the limit of not losing the nonlinear optical effect.

Examples of such a preferred compound are 2-methyl-4-nitroaniline (MNA), 4-nitroaniline, 2-nitroaniline, 3-nitroaniline, 2-methyl-4-nitro-N-methylaniline, 4-nitro-N-cyanomethylaniline, urea, 4-[1-(2-methylol)pyrrolidinyl]-nitrobenzene, 4-[N-(2-hydroxyethyl)-N-ethylamino]-4'-nitroazobenzene (DR-1), 4-nitroanisol, 4-cyanoaniline, 2-[6-(4-carboxyphenylamino)cyclohexa-2,4-dienylidene]-3-ethyl-2,3-dihydroxybenzothiazole,

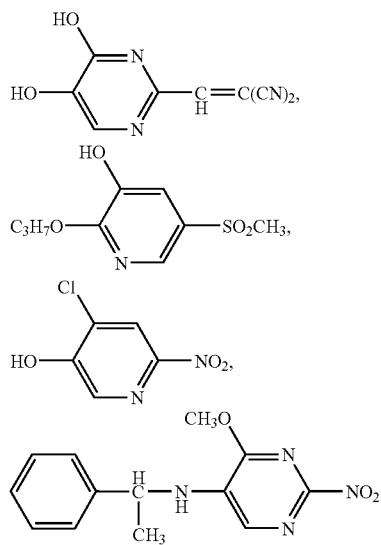

and the like, although those are duplicates of the compounds mentioned supra.

The nonlinear substances may be used solely or in the form of a mixture of two or more thereof.

A suitable amount of nonlinear substance is from 0.1 to 50 parts by weight, preferably from 0.5 to 30 parts by weight based on 100 parts by weight of the curable fluorine-containing prepolymer (I). If the amount of the nonlinear substance is less than 0.1 part by weight, an electro-optical effect is decreased. If the content of nonlinear substance is larger than 50 parts by weight, there are problems that it is difficult to form a thin coating film and the film becomes opaque.

A method of introducing the nonlinear substance (II) to the curable fluorine-containing prepolymer (I) is not limited particularly. The nonlinear substance (II) may be dissolved or dispersed in the curable fluorine-containing prepolymer (I) or may be carried on the polymer trunk chain, an end of the polymer trunk chain or the polymer side chain by ion bonding, coordination bonding or clathration. Also the nonlinear substance (II) may be introduced to the curable fluorine-containing prepolymer (I) by covalent bonding.

For example, there are (1) a method of adding a nonlinear substance to the fluorine-containing monomer giving the structural unit M and having a carbon-carbon double bond and then polymerizing by known synthesizing method such as melt polymerization or anion polymerization to produce the curable fluorine-containing prepolymer (I), (2) a method of dissolving the curable fluorine-containing prepolymer (I) in a solvent, adding and mixing a nonlinear substance thereto and then removing the solvent, (3) a method of melt-kneading the curable fluorine-containing prepolymer (I) and the nonlinear substance and the other method. Among those methods, in the cases of the methods (2) and (3), when the polymer having the structural unit A derived from the fluorine-containing ethylenic monomer having —COOH group which is exemplified supra is used as the curable fluorine-containing prepolymer (I) and aniline derivative such as MNA or MNBA is used as the nonlinear substance (II), it is preferable since ion bonding is formed and dispersibility of the nonlinear substance (II) can be improved.

Further as a method (4), there is a method of using the structural unit A containing the nonlinear substance (II). Examples of the structural unit A containing the nonlinear substance (II) are, for instance, structural units derived from fluorine-containing ethylenic monomer containing the nonlinear substance (II).

Examples of such a structural unit are preferably structural units derived from fluorine-containing ethylenic monomer and represented by the formula (7):

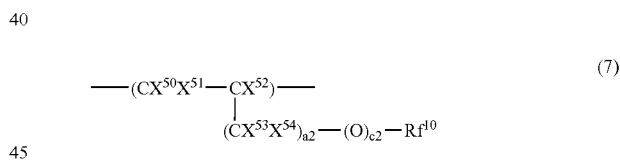

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; $Rf^{10}$ is a monovalent organic group in which at least one $Z^3$ ($Z^3$ is a nonlinear optical substance) is bonded to a fluorine-containing alkyl group having 1 to 40 carbon atoms or a fluorine-containing alkyl group having 2 to 100 carbon atoms and ether bond; a2 is 0 or an integer of from 1 to 3; c2 is 0 or 1.

Further preferred is a structural unit derived from a fluorine-containing ethylenic monomer and represented by the formula (8):

wherein $Rf^{10}$ is a monovalent organic group in which at least one $Z^3$ ($Z^3$ is a nonlinear optical substance) is bonded to a fluorine-containing alkyl group having 1 to 40 carbon atoms or a fluorine-containing alkyl group having 2 to 100 carbon atoms and ether bond.

Examples of such a fluorine-containing ethylenic monomer are, for instance, fluorine-containing ethylenic monomers containing the nonlinear substance (II) and represented by the formula:

$$CH_2=CFCF_2ORf^{10}$$

wherein $Rf^{10}$ is as defined above. Examples thereof are, for instance, monomers such as:

$$CH_2=CFCF_2OCF(CF_3)-Z^3,$$

$$CH_2=CFCF_2OCFCF_2OCF(CF_3)(CF_3)-Z^3,$$

$$CH_2=CFCF_2O(CFCF_2O)_2CF(CF_3)(CF_3)-Z^3,$$

$$CH_2=CFCF_2OCH_2CF_2-Z^3,$$

$$CH_2=CFCF_2OCH_2CF_2CF_2OCF(CF_3)-Z^3,$$

$CH_2=CFCF_2OCF_2CF_2OCF_2-Z^3$ and
$CH_2=CFCF_2O(CF_2CF_2O)_2CF_2-Z^3$ wherein $Z^3$ is as defined above.

Also preferred are fluorine-containing ethylenic monomers containing the nonlinear substance (II) and represented by the formula:

$$CH_2=CFORf^{10}$$

wherein $Rf^{10}$ is as defined above. More concretely there are, for example, monomers such as:
$CF_2=CFOCF_2CF_2-Z^3$, $CF_2=CFOCF_2CF_2CH_2-Z^3$, $$CF_2=CFOCF_2CFOCF_2CF_2-Z^3,$$
$$|$$
$$CF_3$$

$$CF_2=CFOCF_2CFOCF_2CF_2CH_2-Z^3,$$
$$|$$
$$CF_3$$

$CF_2=CFO(CF_2)_3Z^3$, $CF_2=CFO(CF_2)_3CH_2-Z^3$,
$CF_2=CFOCF_2CF_2OCF_2-Z^3$,
$CF_2=CFOCF_2CF_2OCF_2CH_2-Z^3$,
$CF_2=CFOCF_2CF_2CH_2OCF_2CF_2-Z^3$ and
$CF_2=CFOCF_2CF_2CH_2OCF_2CF_2CH_2-Z^3$, wherein $Z^3$ is as defined above.

Further preferred are fluorine-containing ethylenic monomers containing the nonlinear substance (II) and represented by the formulae:
$CF_2=CFCF_2-O-Rf^{10}$, $CF_2=CF-Rf^{10}$,
$CH_2=CH-Rf^{10}$ and $CH_2=CHO-Rf^{10}$ wherein $Rf^{10}$ is as defined above. Concretely there are, for example, monomers such as:
$CF_2=CFCF_2OCF_2CF_2CF_2-Z^3$,
$CF_2=CFCF_2OCF_2CF_2CF_2CH_2-Z^3$, $$CF_2=CFCF_2OCF_2CF-Z^3,$$
$$|$$
$$CF_3$$

$$CF_2=CFCF_2OCF_2CF-CH_2-Z^3,$$
$$|$$
$$CF_3$$

$CF_2=CFCF_2-Z^3$, $CF_2=CFCF_2CH_2-Z^3$,
$CH_2=CHCF_2OF_2CH_2CH_2-Z^3$, $CH_2=CHCF_2CF_2-Z^3$,
$CH_2=CHCF_2CF_2CH_2-Z^3$, $CH_2=CHCF_2CF_2CF_2-Z^3$,
$CH_2=CHCF_2CF_2CF_2CH_2-Z^3$, $CH_2=CHO-CH_2CF_2CF_2-Z^3$,
$CH_2=CHOCH_2CF_2CF_2CH_2-Z^3$ and the like, wherein $Z^3$ is as defined above.

In any of the above-mentioned methods (1) to (4), it is desirable that the curing is carried out after processing into the form of final molded article.

Among the above-mentioned methods, the methods (2) and (4) are suitable from the point that the nonlinear substance can be dispersed homogeneously in the curable fluorine-containing prepolymer. In the method (2), particularly suitable method is a method of dissolving the curable fluorine-containing prepolymer in a solution containing the nonlinear substance and then heating the obtained homogeneous solution to distill off the solvent. The composition which is in the form of solution or dispersion without being subjected to distilling off the solvent may be used as a starting solution for a waveguide forming process mentioned infra.

The second of the present invention relates to the nonlinear optical material produced by curing the fluorine-containing resin composition of the present invention comprising the fluorine-containing prepolymer (I) and the nonlinear optical substance (II).

The embodiments of the fluorine-containing prepolymer and curable fluorine-containing resin composition and the curing method which are preferred for obtaining the cured article are partly mentioned supra, and the details thereof are further explained below though there is a case where the explanations are overlapped.

The curable fluorine-containing resin composition of the present invention can be obtained by using only the fluorine-containing prepolymer (I) and the nonlinear substance (II) and may be in the form of a photo-curable composition by further adding an active energy curing initiator (III) such as a photoradical generator (III-1) or a photoacid generator (III-2).

The active energy curing initiator (III) generates a radical or a cation (acid) only by irradiation of, for example, an electromagnetic wave having a wavelength of not more than 350 nm, namely, active energy rays such as ultraviolet light, electron beam, X-ray, γ-ray or the like and functions as a catalyst for initiating curing (crosslinking reaction) of a carbon-carbon double bond of the fluorine-containing prepolymer (I). Usually an initiator which generates a radical or a cation (acid) by irradiation of ultraviolet light can be used and particularly preferably one which generates a radical can be used.

According to the fluorine-containing resin composition for the nonlinear optical material of the present invention, the curing reaction can be initiated easily with the above-mentioned active energy rays, heating at high temperature is not necessary and the curing reaction can be carried out at relatively low temperature. Therefore the fluorine-containing resin composition is preferred since it can be applied on a substrate, for example, a transparent resin substrate which has a low heat resistance and is apt to be deformed, decomposed or colored due to heat.

In the composition of the present invention, the active energy curing initiator (III) is optionally selected depending on kind of the carbon-carbon double bond in the side chain of the fluorine-containing prepolymer (I) (whether it is radical-reactive or cation (acid)-reactive), kind (wavelength range, etc.) of the active energy ray, intensity of irradiation, etc.

Generally examples of the initiator (photoradical generator) which functions to cure the fluorine-containing prepolymer (I) having a radical-reactive carbon-carbon double bond with active energy ray in an ultraviolet region are, for instance, those mentioned below.

Acetophenone Initiators

Acetophenone, chloroacetophenone, diethoxyacetophenone, hydroxyacetophenone, α-aminoacetophenone and the like.

Benzoin Initiators

Benzoin, benzoinmethylether, benzoinethylether, benzoinisopropylether, benzoinisobutylether, benzyldimethylketal and the like.

Benzophenone Initiators

Benzophenone, benzoyl benzoate, methyl-o-benzoylbenzoate, 4-phenylbenzophenone, hydroxybenzophenone, hydroxy-propylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Also as case demands, an auxiliary for photo-initiation such as amines, sulfones or sulfines may be added.

Also examples of the initiator (photoacid generator) which cures the fluorine-containing prepolymer (I) having a cation (or acid)-reactive carbon-carbon double bond are those mentioned below.

Onium Salts

Iodonium salt, sulfonium salt, phosphonium salt, diazonium salt, ammonium salt, pyridinium salt and the like.

Sulfone Compounds

β-ketoester, β-sulfonylsulfone, α-diazo compounds thereof and the like.

Sulfonic Acid Esters

Alkylsulfonic acid ester, haloalkylsulfonic acid ester, arylsulfonic acid ester, iminosulfonate and the like.

Others

Sulfonimide compounds, diazomethane compounds and the like.

Examples of the radical-reactive carbon-carbon double bond are, for instance, those represented by the above-mentioned formula, that is,

—O(C=O)CX$^6$=CX$^7$X$^8$ and examples of the cation-reactive carbon-carbon double bond are, for instance, those represented by the above-mentioned formulae, that is,

—OCH=CH$_2$,

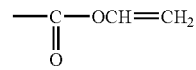

and the like.

The photo-curable fluorine-containing resin composition which is used for the nonlinear optical material of the present invention comprises, as mentioned above, the fluorine-containing prepolymer (I) and the nonlinear substance (II) (including not only a nonlinear substance but also an ion thereof and/or a compound containing a nonlinear substance). Further if necessary, an active energy curing initiator (III) is added to form the curable fluorine-containing resin composition and further a solvent mentioned infra may be added to obtain a coating solution of the fluorine-containing resin composition and as case demands, a curing agent may be added thereto.

Preferred curing agents are those which have at least one carbon-carbon unsaturated bond and can be polymerized with a radical or an acid. Examples thereof are radically polymerizable monomers such as acrylic monomers and cationically polymerizable monomers such as vinyl ether monomers. Those monomers may be monofunctional monomers having one carbon-carbon double bond or polyfunctional monomers having two or more carbon-carbon double bonds.

Those so-called curing agents having a carbon-carbon unsaturated bond react by a radical or cation generated by a reaction of the active energy curing initiator in the composition of the present invention with an active energy ray such as light and can be crosslinked with the carbon-carbon double bond in a side chain or at an end of a trunk chain of the fluorine-containing prepolymer (I) in the composition of the present invention by copolymerization.

Examples of the monofunctional acrylic monomer are acrylic acid, acrylic acid esters, methacrylic acid, methacrylic acid esters, α-fluoroacrylic acid, α-fluoroacrylic acid esters, maleic acid, maleic anhydride, maleic acid esters and (meth)acrylic acid esters having epoxy, hydroxyl, carboxyl or the like.

Among them, particularly preferred are acrylate monomers having fluoroalkyl group in order to maintain a high near infrared transparency of a cured article. For example, preferred are compounds represented by the formula:

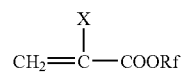

wherein X is H, CH$_3$ or F; Rf is a fluorine-containing alkyl group having 2 to 40 carbon atoms or a fluorine-containing alkyl group having 2 to 100 carbon atoms and ether bond.

Examples thereof are:

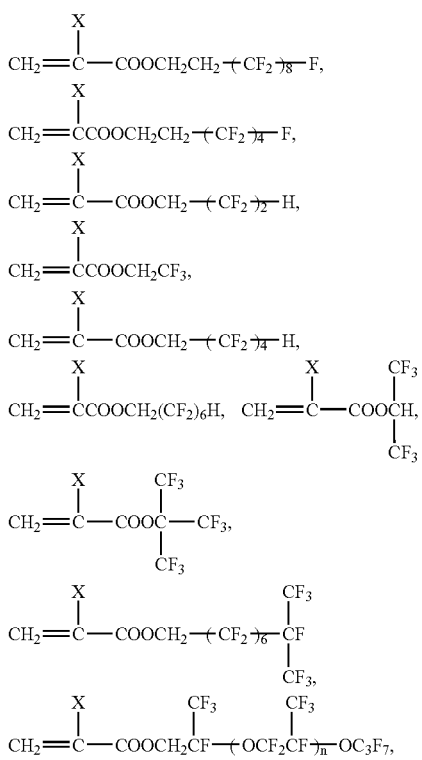

(X is as defined above; n: from 1 to 5)
and the like.

As the polyfunctional acrylic monomer, there are generally known compounds obtained by replacing hydroxyl groups of polyhydric alcohols such as diol, triol and tetraol with acrylate groups, methacrylate groups or α-fluoroacrylate groups.

Examples thereof are compounds obtained by replacing two or more hydroxyl groups of polyhydric alcohols such as 1,3-butanediol, 1,4-butanediol, 1,6-hexanediol, diethylene glycol, tripropylene glycol, neopentyl glycol, trimethylol propane, pentaerythritol and dipentaerythritol with any of acrylate groups, methacrylate groups or α-fluoroacrylate groups.

Also there can be used polyfunctional acrylic monomers obtained by replacing two or more hydroxyl groups of polyhydric alcohols having a fluorine-containing alkyl group or a fluorine-containing alkylene group with acrylate groups, methacrylate groups or α-fluoroacrylate groups. Those compounds are preferred particularly from the point that a high near infrared transparency of a cured article can be maintained.

Preferable examples thereof are compounds having a structure obtained by replacing two or more hydroxyl groups of fluorine-containing polyhydric alcohols represented by the formulae:

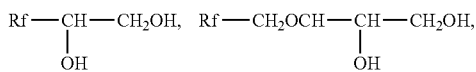

(Rf is a fluorine-containing alkyl group having 1 to 40 carbon atoms)

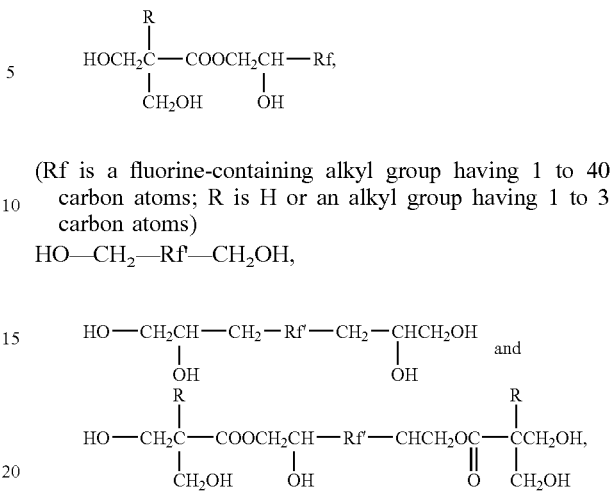

(Rf is a fluorine-containing alkyl group having 1 to 40 carbon atoms; R is H or an alkyl group having 1 to 3 carbon atoms)

HO—CH$_2$—Rf'—CH$_2$OH, (Rf' is a fluorine-containing alkylene group having 1 to 40 carbon atoms; R is H or an alkyl group having 1 to 3 carbon atoms), with acrylate groups, methacrylate groups or α-fluoroacrylate groups.

When those exemplified monofunctional and polyfunctional acrylic monomers are used as the curing agent for the composition of the present invention, particularly preferred are α-fluoroacrylate compounds from the viewpoint of good curing reactivity.

In the curable fluorine-containing resin composition for the nonlinear optical material of the present invention, an adding amount of the active energy curing initiator (III) is optionally selected depending on the content of carbon-carbon double bonds in the fluorine-containing prepolymer (I), an amount of the curing agent and further kinds of the initiator and active energy ray and an amount of irradiation energy (intensity and time) and also depending on whether or not the above-mentioned curing agent is used.

When the curing agent is not used, the amount of the initiator is from 0.01 to 30 parts by weight, preferably from 0.05 to 20 parts by weight, most preferably from 0.1 to 10 parts by weight based on 100 parts by weight of the fluorine-containing prepolymer (I). Concretely the amount of the initiator is from 0.05 to 50% by mole, preferably from 0.1 to 20% by mole, most preferably from 0.5 to 10% by mole based on the content (the number of moles) of carbon-carbon double bonds contained in the fluorine-containing prepolymer (I).

When the curing agent is used, the amount of the initiator is from 0.05 to 50% by mole, preferably from 0.1 to 20% by mole, most preferably from 0.5 to 10% by mole based on the sum of the content (the number of moles) of carbon-carbon double bonds contained in the fluorine-containing prepolymer (I) and the number of moles of carbon-carbon unsaturated bonds of the curing agent.

To the composition of the present invention may be added various additives as case demands in addition to the above-mentioned compounds.

Examples of the additives are, for instance, a leveling agent, viscosity control agent, light-stabilizer, moisture absorbing agent, pigment, dye, reinforcing agent and the like.

The curable fluorine-containing resin composition for the nonlinear optical material of the present invention is, as explained infra, dissolved or dispersed in a solvent and is used for production of various members for optical amplification.

The solvent to be used for making the solution is not limited particularly as far as the fluorine-containing prepolymer (I), nonlinear substance (II), active energy curing initiator (III) and additives to be added as case demands such as a curing agent, leveling agent and light stabilizer are homogeneously dissolved or dispersed in it. Particularly preferred is a solvent dissolving the fluorine-containing prepolymer (I) homogeneously.

Examples of the solvent are, for instance, cellosolve solvents such as methyl cellosolve, ethyl cellosolve, methyl cellosolve acetate and ethyl cellosolve acetate; ester solvents such as diethyl oxalate, ethyl pyruvate, ethyl-2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether; ketone solvents such as 2-hexanone, cyclohexanone, methyl amino ketone and 2-heptanone; alcohol solvents such as methanol, ethanol, propanol, isopropanol and butanol; aromatic hydrocarbons such as toluene and xylene; a solvent mixture of two or more thereof and the like.

Also in order to enhance solubility of the fluorine-containing prepolymer (I), a fluorine-containing solvent may be used as case demands.

Examples of the fluorine-containing solvent are, for instance, $CH_3CCl_2F$ (HCFC-141b), a mixture of $CF_3CF_2CHCl_2$ and $CClF_2CF_2CHClF$ (HCFC-225), perfluorohexane, perfluoro(2-butyltetrahydrofuran), methoxy-nonafluorobutane, 1,3-bistrifluoromethylbenzene, and in addition, fluorine-containing alcohols such as:

$H(CF_2CF_2)_nCH_2OH$ (n: an integer of from 1 to 3)
$F(CF_2)_nCH_2OH$ (n: an integer of from 1 to 5) and
$(CF_3)_2CHOH$, benzotrifluoride, perfluorobenzene, perfluoro(tributylamine), $ClCF_2CFClCF_2CFCl_2$ and the like.

Those fluorine-containing solvents may be used solely, in a mixture thereof or in a mixture of one or more of the fluorine-containing solvents and non-fluorine-containing solvents.

Among them, ketone solvents, acetic acid ester solvents, alcohol solvents and aromatic solvents are preferred from the viewpoint of coatability and productivity of a coating film.

The fluorine-containing resin composition of the present invention is formed into a cured article by photo-curing and constitutes a part of the nonlinear optical device such as a nonlinear waveguide device.

The cured article is one having a maximum absorption coefficient of not more than 1 cm$^{-1}$ in wavelength ranges of from 600 to 900 nm, from 1,290 to 1,320 nm and/or from 1,530 to 1,570 nm.

The present inventors have found that when the fluorine-containing resin composition comprising the above-mentioned fluorine-containing prepolymer (I) and the nonlinear optical substance (II) is cured by the above-mentioned method, an obtained cured article is provided with excellent characteristics, that is:

(1) mechanical properties and thermal stability are excellent and (2) a nonlinear optical effect can be maintained even at high temperature, and further it becomes possible to provide a nonlinear optical material excellent in transparency, particularly transparency in a near infrared region.

The third of the present invention relates to the fluorine-containing polymer in which a moiety exhibiting a nonlinear optical effect is bonded to its side chain and relates to the fluorine-containing nonlinear optical material obtained therefrom.

The fluorine-containing polymer (III) having a moiety exhibiting a nonlinear optical effect in its side chain is the fluorine-containing polymer having a number average molecular weight of from 500 to 1,000,000 which is represented by the formula (2):

   (2)

in which the structural unit M' is a structural unit derived from a fluorine-containing ethylenic monomer and represented by the formula (M'):

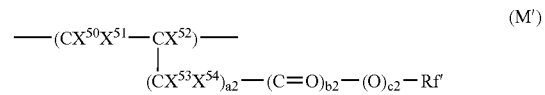   (M')

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; b2 and c2 are the same or different and each is 0 or 1, the structural unit A1 is a structural unit derived from monomer copolymerizable with the fluorine-containing ethylenic monomer represented by the formula (M'), and the structural unit M' and the structural unit A1 are contained in amounts of from 0.1 to 100% by mole and from 0 to 99.9% by mole, respectively.

Namely, the fluorine-containing polymer is a homopolymer of a fluorine-containing ethylenic monomer having an organic group exhibiting a nonlinear optical effect which is bonded to the polymer side chain through a fluorine-containing alkylene group or a fluorine-containing alkylene group having ether bond or a copolymer comprising the structural unit M' as an essential component.

In Rf' may be bonded at least one moiety P comprising an organic group exhibiting a nonlinear optical effect, and two or more portions P may be bonded in Rf'.

Also P may be bonded to any positions in the Rf' structure of the side chain, for example, P may be positioned at an end of the side chain or may be positioned in the midst of the side chain to form a part of the side chain structure. Further P may be bonded in the form of branch in the midst of the side chain. P being positioned at an end of the side chain is particularly preferred since orientation can be easily carried out at low voltage.

The fluorine-containing polymer of the present invention having a fluorine-containing structural unit containing the moiety P comprising an organic group exhibiting a nonlinear optical effect has characteristics that:
(1) the component having a nonlinear optical effect is homogeneously dispersed and any portions of the polymer can give an even nonlinear optical effect,
(2) orientation can be carried out even without crystallizing the component having a nonlinear optical effect,
(3) a thin coating film can be obtained, and
(4) generation of birefringence can be inhibited.

The present inventors have found that when the component having a nonlinear optical effect is introduced to the fluorine-containing side chain by bonding, the characteristics of (1) to (4) are compatible with transparency, particularly transparency in a near infrared region.

The moiety P comprising an organic group exhibiting a nonlinear optical effect is a moiety comprising an organic group having π-electron conjugation, in which an electron-donating group and/or an electron-accepting group are bonded to the organic group having π-electron conjugation.

The organic group having π-electron conjugation is preferably a cyclic compound. Examples thereof are aromatic compounds having benzene ring, pyrimidine ring, oxazole ring, furan ring, thiazole ring, thiadiazole ring, oxathiazole ring, benzothiazole ring, benzoxazole ring, benzoxathiazole ring, naphthalene ring, anthracene ring and isoquinoline ring and fluorine-substituted compounds thereof. Among them, particularly preferred are benzene ring, thiazole ring, thiadiazole ring, benzothiazole ring, naphthalene ring and the like.

Examples of the electron-donating group are alkyl, phenol, alkylether, thiophenol, alkylthioether, amino, alkylamine, dialkylamine, cycloalkylamine, cycloalkyleneamine and derivatives thereof in which an end of alkyl is replaced with hydroxyl, thiol or amino.

Examples of the electron-accepting group are perfluoroalkyl, pentafluorophenyl, nitro, cyano, dicyanovinyl, tricyanovinyl and the like.

Examples of the moiety P comprising an organic group exhibiting a nonlinear optical effect is the same as the above-mentioned examples of the organic substance (II) having a second- or higher-order nonlinear optical effect. Any of atoms of those nonlinear substances is bonded in the structure of the polymer side chain to form the fluorine-containing polymer of the present invention.

In the nonlinear optical material of the present invention, the organic group P exhibiting a nonlinear optical effect can be present in the Rf' group by covalent bonding, ion bonding or coordination bonding, and the covalent bonding is particularly preferred from the viewpoint of stability, heat resistance, water resistance, etc. Also there are the same groups as the above-mentioned $Z^3$.

Examples of the preferred covalent bonding are a carbon-carbon bond, ether bond, ester bond, amide bond, urethane bond, carbonate bond, amino bond and the like.

Among them, the carbon-carbon bond, ether bond, ester bond and amide bond are preferred from the viewpoint of stability and heat resistance.

In the fluorine-containing polymer (III) of the present invention which has the moiety exhibiting a nonlinear optical effect and being bonded to the polymer side chain, —Rf— contained in the structural unit M' is a fluorine-containing alkylene group having 1 to 40 carbon atoms or a fluorine-containing alkylene group having 2 to 100 carbon atoms and ether bond. In the Rf' group, fluorine atom is bonded to carbon atom. The Rf' group is generally a fluorine-containing alkylene group or fluorine-containing alkylene group having ether bond in which fluorine atom and hydrogen atom or chlorine atom is bonded to carbon atom. It is preferable that fluorine atoms are contained in a larger amount (higher fluorine content). The Rf' group is more preferably a perfluoroalkylene group or a perfluoroalkylene group having ether bond. The fluorine content in the fluorine-containing polymer (III) is not less than 25% by weight, preferably not less than 40% by weight, which is preferred because near infrared transparency of the fluorine-containing polymer (III) can be increased and a high near infrared transparency can be maintained even if a degree of curing (crosslinking density) is increased in order to increase heat resistance and modulus of elasticity of a cured article.

Too large number of carbon atoms of the —Rf'— group is not preferred because there is a case where solubility in a solvent is lowered and transparency is lowered in case of a fluorine-containing alkylene group, and because mechanical properties of the polymer itself are lowered in case of a fluorine-containing alkylene group having ether bond. The number of carbon atoms of the fluorine-containing alkylene group is preferably from 1 to 20, more preferably from 1 to 10. The number of carbon atoms of the fluorine-containing alkylene group having ether bond is preferably from 2 to 30, more preferably from 2 to 20.

Preferred examples of —Rf'— are the same as those raised as the examples of —Rf— contained in the structural unit M.

In the fluorine-containing polymer (III) of the formula (2) having, in its side chain, a moiety exhibiting a nonlinear optical effect, the structural unit (M') is preferably the structural unit M'-1 derived from a fluorine-containing ethylenic monomer and represented by the formula (M'-1):

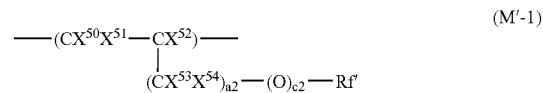

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; c2 is 0 or 1.

Further preferred structural unit M'-1 is the structural unit M'-2 derived from a fluorine-containing ethylenic monomer and represented by the formula (M'-2):

wherein Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond.

Examples thereof are preferably structural units derived from monomers represented by:

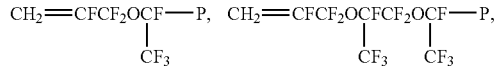

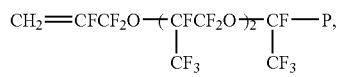

$CH_2=CFCF_2OCH_2CF_2-P,$

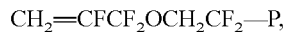

$CH_2=CFCF_2OCF_2CF_2OCF_2-P$ and
$CH_2=CFCF_2O-(CF_2CF_2O-)_2CF_2-P$ (P is as defined above).

Further preferred structural unit M'-1 is the structural unit M'-3 derived from a fluorine-containing ethylenic monomer and represented by the formula (M'-3):

wherein Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond.

Examples thereof are preferably structural units derived from monomers represented by:
$CF_2=CFOCF_2CF_2-P, CF_2=CFOCF_2CF_2CH_2-P,$

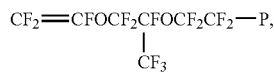

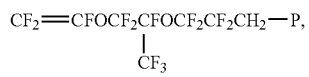

$CF_2=CFO-(CF_2-)_3P, CF_2=CFO-(CF_2-)_3CH_2-P,$
$CF_2=CFOCF_2CF_2OCF_2-P,$
$CF_2=CFOCF_2CF_2OCF_2CH_2-P,$
$CF_2=CFOCF_2CF_2CH_2OCF_2CF_2-P$ and
$CF_2=CFOCF_2CF_2CH_2OCF_2CF_2CH_2-P$ (P is as defined above).

Also preferred are structural units derived from fluorine-containing ethylenic monomers represented by:
$CF_2=CFCF_2-O-Rf', CF_2=CF-Rf',$
$CH_2=CH-Rf'$ and $CH_2=CH-O-Rf'$ wherein Rf' is as defined above.

Concretely there are, for example,
$CF_2=CFCF_2OCF_2CF_2CF_2-P,$
$CF_2=CFCF_2OCF_2CF_2CF_2CH_2-P,$

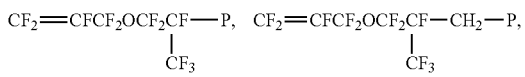

$CF_2=CFCF_2-P, CF_2=CFCF_2CH_2-P,$
$CH_2=CHCF_2OF_2CH_2CH_2-P, CH_2=CHCF_2CF_2-P,$
$CH_2=CHCF_2CF_2CH_2-P, CH_2=CHCF_2CF_2CF_2CF_2-P,$
$CH_2=CHCF_2CF_2CF_2CH_2-P, CH_2=CHO-CH_2CF_2CF_2-P,$
$CH_2=CHOCH_2CF_2CF_2CH_2-Z^1$ and the like, wherein P is as defined above.

In the fluorine-containing polymer of the present invention in which the moiety exhibiting a nonlinear optical effect is bonded to its side chain, the structural unit A1 is an optional component. The structural unit A1 is not limited particularly as far as it is a monomer copolymerizable with the structural units M', M'-1, M'-2 and M'-3. The structural unit A1 may be optionally selected depending on applications and required characteristics of the polymer.

Examples of the structural unit A1 are preferably the same as the examples (i) to (v) of the structural unit A which are optional components of the fluorine-containing prepolymer (I) of the above-mentioned formula (1).

In the fluorine-containing polymer of the present invention in which the moiety exhibiting a nonlinear optical effect is bonded to its side chain, it is preferable that combinations and proportions of the structural units M' (M'-1, M'-2 or M'-3) and A1 are selected within the range where the combination of the structural units M' and A1 makes the polymer non-crystalline. Various combinations and proportions can be selected from the above-mentioned examples depending on intended applications, physical properties (particularly glass transition temperature, hardness, etc.), functions (transparency and near infrared transparency), etc.

The fluorine-containing polymer having the nonlinear optical moiety contains the structural unit M' (M'-1, M'-2 or M'-3) as an essential component and has functions due to the structural unit M' itself such as maintaining a high near infrared transparency, imparting transparency and being capable of imparting a nonlinear optical effect directly or by orientation treatment. Therefore even if the fluorine-containing polymer of the present invention having the nonlinear optical moiety contains a larger amount of the structural unit M' or in the extreme case, even if the polymer consists of the structural unit M' (100% by mole), a high near infrared transparency can be maintained.

Also in the case of the copolymer comprising the structural unit M' and the structural unit A1, when the structural unit A1 is selected from the above-mentioned examples, there can be obtained the polymer providing a cured article having a higher hardness (a high glass transition temperature) and a higher near infrared transparency.

In the copolymer comprising the structural unit M' and the structural unit A1, the proportion of the structural unit M' may be not less than 0.1% by mole based on the whole monomers constituting the fluorine-containing polymer having the nonlinear optical moiety. It is preferable that the proportion is not less than 2.0% by mole, preferably not less than 5% by mole, more preferably not less than 10% by mole in order to obtain the nonlinear optical effect.

The fluorine-containing polymer of the present invention having the nonlinear optical moiety has preferable characteristics particularly for the nonlinear optical material applications in a near infrared region since transparency is not lowered even if the proportion of the structural unit M' is increased (or even if the number of cure sites is increased).

In the case where the fluorine-containing polymer of the present invention having the nonlinear optical moiety is used as a nonlinear optical material for optical functional devices to be used for optical communication, a high transparency is required and therefore it is important that the fluorine-containing polymer has a combination and proportion of the structural units M' and A1 which can make the polymer non-crystalline.

Being non-crystalline means that when in DSC analysis, measurement is carried out at a temperature increasing rate of 10° C./min, a heat absorption peak of melting is not substantially observed or heat of fusion is 1 J/g or lower.

It is preferable that the fluorine content of the fluorine-containing polymer of the present invention having the nonlinear optical moiety is not less than 25% by weight.

If the fluorine content is low, transparency in a near infrared region is lowered. Also if the fluorine content is low, moisture absorbing properties are also increased and therefore the polymer cannot be used substantially as an optical material. For the nonlinear optical material applications, most preferable fluorine content is not less than 40% by weight.

It is preferable that the fluorine-containing polymer of the present invention having the nonlinear optical moiety has a maximum absorption coefficient of not more than 1 cm$^{-1}$ in specific wavelength ranges (from 1,290 to 1,320 nm and/or from 1,530 to 1,570 nm and/or from 600 to 900 nm). If the absorption coefficient is higher than that, the polymer is not suitable as a nonlinear optical material used in optical communication.

The molecular weight of the fluorine-containing polymer of the present invention having the nonlinear optical moiety can be selected, for example, in a range of from 500 to 1,000,000 in number average molecular weight, and is preferably from 1,000 to 500,000, particularly preferably from 2,000 to 200,000.

If the molecular weight is too low, mechanical properties are apt to be insufficient even after the curing. If the molecular weight is too high, solubility in a solvent is lowered, and film forming property and leveling property are apt to be lowered particularly at forming a thin film. For optical waveguide applications, most preferable molecular weight is selected in a range of from 5,000 to 100,000 in number average molecular weight.

It is preferable that the fluorine-containing polymer (before curing) of the present invention having the nonlinear optical moiety has a maximum absorption coefficient of not more than 1 cm$^{-1}$, more preferably not more than 0.5 cm$^{-1}$, particularly preferably not more than 0.1 cm$^{-1}$ in the wavelength range of from 1,290 to 1,320 nm, from 1,530 to 1,570 nm or from 600 to 900 nm and further has a refractive index in nd of from 1.3 to 1.7. Adjustments thereof can be made by determining various kinds and contents of the structural unit M' and kinds of the structural unit A1 to be used as case demands and make selection of a clad easy when forming the waveguide.

Further it is preferable that the fluorine-containing polymer having the nonlinear optical moiety is soluble in general-purpose solvents, for example, in at least one of ketone solvents, acetic acid ester solvents, alcohol solvents and aromatic solvents or in solvent mixtures containing at least one of the above-mentioned general-purpose solvents.

When the polymer is soluble in general-purpose solvents, it is preferable because film forming property and homogeneity are excellent particularly in case where formation of a thin coating film of about 3 μm is required in a process for forming an optical waveguide. The polymer is also advantageous from the viewpoint of productivity in forming an optical waveguide.

In order to obtain the fluorine-containing polymer (III) of the present invention having the nonlinear optical moiety, generally any of:

(i) a method of previously synthesizing a monomer having P and then polymerizing the monomer, (ii) a method of once synthesizing a polymer having another functional group and then converting the functional group by high molecular reaction, thus introducing the functional group P to the polymer, or the like method can be employed.

The fluorine-containing polymer of the present invention having the nonlinear optical moiety may be used as the organic substance (II) exhibiting a second- or higher-order nonlinear optical effect in the above-mentioned fluorine-containing resin composition and therefore may be blended to the fluorine-containing prepolymer (I) having a cure site.

Thereby, the nonlinear optical material having a higher transparency, excellent stability of the nonlinear optical effect and excellent thermal stability can be obtained.

Further a cured article obtained by curing the fluorine-containing resin composition by the above-mentioned method naturally becomes a good nonlinear optical material.

The fourth of the present invention relates to the fluorine-containing polymer having the both of a carbon-carbon double bond and a moiety exhibiting a nonlinear optical effect, and relates to the fluorine-containing nonlinear optical material characterized by using the fluorine-containing polymer.

The fluorine-containing polymer (IV) having the both of a carbon-carbon double bond and a moiety exhibiting a nonlinear optical effect is a fluorine-containing polymer having a number average molecular weight of from 500 to 1,000,000 which is represented by the formula (3):

in which the structural unit M is a structural unit derived from a fluorine-containing ethylenic monomer and represented by the formula (M):

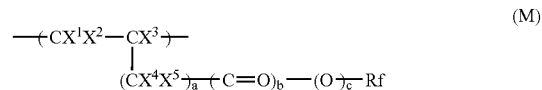

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit M' is a structural unit derived from a fluorine-containing ethylenic monomer and represented by the formula (M'):

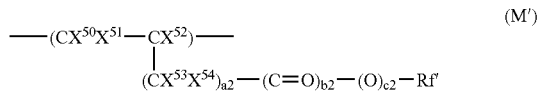
(M')

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; b2 and c2 are the same or different and each is 0 or 1, the structural unit A2 is a structural unit derived from monomer copolymerizable with the fluorine-containing ethylenic monomers represented by the formulae (M) and (M'), and the structural unit M, the structural unit M' and the structural unit A2 are contained in amounts of from 0.1 to 99.9% by mole, from 0.1 to 99.9% by mole and from 0 to 99.8% by mole, respectively.

The fluorine-containing polymer (IV) is preferred since the polymer has the nonlinear optical effect of the structural unit M' and the effect of, by curing the structural unit M, enhancing mechanical properties and thermal stability of the nonlinear optical material.

Namely, the present inventors have found that by introducing both of the structural unit M having a cure site and the structural M' having the nonlinear optical moiety, excellent characteristics that:

(1) a uniform nonlinear optical effect is exhibited,
(2) mechanical properties and thermal stability are excellent, and
(3) the nonlinear optical effect can be maintained even at high temperature, are obtained, which makes it possible to provide the nonlinear optical material being excellent in transparency, particularly transparency in a near infrared region.

Examples of the structural unit M and M' of the fluorine-containing polymer (IV) are preferably the same as mentioned above, and preferred examples of the structural unit A2 which is an optional component are the same as those of the structural unit A.

In order to obtain the fluorine-containing polymer (IV), generally any of:

(i) a method of previously synthesizing a monomer having P and a monomer having $Y^1$ and then copolymerizing the monomers,
(ii) a method of once synthesizing a polymer having $Y^1$ and, if necessary another functional group and then partly introducing the functional group P to the polymer by high molecular reaction, or the like method can be employed.

The fluorine-containing resin composition of the present invention comprising the fluorine-containing prepolymer (I) and the nonlinear optical substance (II) and the cured article obtained from the composition or the fluorine-containing polymer (III) or (IV) of the present invention having the nonlinear optical moiety and the cured article obtained therefrom may be subjected to poling treatment in order to enhance the nonlinear optical effect more.

The poling treatment is carried out by applying an electric field on the nonlinear optical substance in the fluorine-containing resin composition or on the moiety exhibiting a nonlinear optical effect in the fluorine-containing polymer for orientation in order to arrange molecular polarization in one direction. This treatment is preferred since polarization of each molecule does not disappear by collision with each other and a larger nonlinear optical effect can be obtained.

The poling treatment is usually carried out by applying DC electric field at a glass transition temperature or more of the fluorine-containing polymer (or the nonlinear optical material itself) forming a matrix in the fluorine-containing resin composition.

For applying a poling voltage, there can be employed, for example:

(i) a corona poling method in which a high voltage is applied between a thin metallic wire electrode or a metallic plate electrode and the nonlinear optical material (for example, one in the form of thin film) and a generated corona discharge is used, or
(ii) a contact poling method in which the nonlinear optical material (for example, one in the form of thin film) is put between two electrodes and a high voltage is applied.

Preferred is the contact poling method because of easy operation, less damage on the thin film and good uniformity.

In the fluorine-containing polymer having a cure site of the present invention, in order to further efficiently form the orientation and obtain stability of direction by the poling treatment, it is preferable to carry out the following steps, in order:

(i) a step for forming a coating film of the composition comprising the fluorine-containing prepolymer (I),
(ii) a step for subjecting the coating film to poling treatment by the above-mentioned method, and
(iii) a step for curing, by the above-mentioned method, the coating film after the poling treatment.

In the above-mentioned series of steps, it is desirable that the curing is carried out immediately after the poling treatment, which can solve the problem that the nonlinear optical substance (or the nonlinear optical moiety in the fluorine-containing polymer) once oriented loses the nonlinear optical effect due to relaxation of orientation.

Namely, it is more preferable that the curing reaction is carried out by, for example, irradiation of ultraviolet rays while heating at a temperature of a glass transition temperature or more of the fluorine-containing prepolymer (I).

The fifth of the present invention relates to the optical waveguide device obtained from the fluorine-containing resin composition of the present invention comprising the fluorine-containing prepolymer (I) and the nonlinear optical substance (II) or the cured article thereof or the fluorine-containing polymer (III) or (IV) of the present invention having the nonlinear optical moiety or the cured article thereof (in the present invention, those having a nonlinear optical effect are generically referred to as "fluorine-containing nonlinear optical material") which are all explained above.

Firstly the optical waveguide device produced using the fluorine-containing nonlinear optical material of the present invention is explained below. The fluorine-containing nonlinear optical material of the present invention is coated on a surface of a plane substrate to form a thin nonlinear optical layer which is used as the optical waveguide device of the present invention as it is or by further forming thereon an optical waveguide channel using a material having a refractive index higher than that of the nonlinear optical layer. The nonlinear optical layer is a layer causing a nonlinear optical effect when light is transmitted through the device.

The optical waveguide device of the present invention can also be produced by a method of firstly forming, on a substrate surface, an optical waveguide in the form of groove and then forming a nonlinear optical layer in the form of thin film in the waveguide.

As the material of the substrate for the optical waveguide device, there are mainly used quartz, heat resistant silica glass, graphite, silicon, molybdenum disulfide, sodium chloride, potassium chloride and the like. The thickness of the substrate is not limited particularly, and preferred thickness is not less than 0.1 mm. Particularly if the substrate thickness is less than 0.1 mm, there arises a problem that a flatness of substrate surface and a desired strength cannot be obtained.

The thickness of the above-mentioned nonlinear optical layer varies depending on a refractive index of the substrate, a refractive index of the nonlinear optical layer, nonlinear sensitivity of the nonlinear optical layer and the like, and generally a thickness of from 0.1 to 5 µm is suitable. If the thickness of the nonlinear optical layer is less than 0.1 µm, enough nonlinear optical effect is difficult to obtain. On the other hand, if the thickness of the nonlinear optical layer is larger than 5 µm, control of waveguide light becomes difficult. Particularly preferred is a thickness of from 0.3 to 2 µm.

For forming a film of the fluorine-containing nonlinear optical material of the present invention on a substrate, there can be used known technologies such as a spin coating method, casting method, dip coating method, melt-press method, deposition method, LB method (Langmuir-Blodgett film), epitaxial method and the like. Among them, the spin coating method is particularly preferred. When forming the film by the spin coating method, casting method or dip coating method, the fluorine-containing nonlinear optical material before the curing or the fluorine-containing nonlinear optical material not having a cure site may be dissolved in the above-mentioned organic solvent such as methyl ethyl kotone and the obtained solution may be coated on the substrate. As case demands, the same curing treatment as mentioned above may be carried out.

Examples of the optical waveguide device spreading wide are a plane waveguide in which light is transmitted through a thin film of the nonlinear optical layer and a channel waveguide device in which a waveguide being in the form of a channel is made of a material having a refractive index slightly higher than that of the nonlinear optical layer and light is introduced through the channel. In the case of the channel waveguide device, there are one which has a waveguide channel produced from the same material as that of the substrate, namely a waveguide in the form of a channel is ditched on the substrate, and another one in which materials of the substrate and waveguide channel are different from each other. In the case of the latter waveguide device, examples of preferred material of the waveguide channel are transparent resins such as polycarbonate and polymethyl methacrylate, glass, $As_2S_3$, $As_2S_5$, ZnO, $LiTaO_3$, $Nb_2O_5$, $Ta_2O_5$, $Si_3N_4$ and the like. Among them, particularly preferred are glass, polymethyl methacrylate and ZnO. It is a matter of course that the fluorine-containing prepolymer (I) not containing a nonlinear substance may be cured as it is and used as the waveguide channel material.

For the optical waveguide device of the present invention, there can be used a waveguide in the form of slab, channel, ball or the like.

A shape of a cross-section and length of the above-mentioned waveguide depend on a transmission loss and refractive index of the waveguide and are not limited particularly. In the case of slab waveguide, a suitable thickness of the wavegiude layer is from 0.05 to 3 µm and a length of from 1 to 30 mm is well used. In the case of channel waveguide, a distance between the channels is suitably from 2 to 30 µm.

For producing the slab waveguide, a spin coating method, deposition method, sputtering method, CVD method, ion exchange method, ion implantation method, epitaxial method and the like can be used. For producing the channel waveguide, ion exchange method, photolithography method, etching method, sputtering method, ion implantation method and epitaxial method can be used. Preferably etching method, ion exchange method, photolithography method or the like can be suitably used.

For the optical waveguide device of the present invention, electrodes can be optionally provided on the top and bottom of the nonlinear optical layer as case demands. As the electrode, there are various electric conductors. Examples of a material therefor which can be used suitably are ITO, gold, silver, chromium, aluminum and the like. The nonlinear optical waveguide device of the present invention can be used for various devices such as a linear device, Y-branch device, orientation coupler device, Mach Zehnder interferometer type optical device, Fabry-Perot resonant device, ferroelectric inversion domain type SHG device and the like.

In the device of the present invention, for excitation of waveguide light in the nonlinear optical layer, there can be used an edge coupler method, prism coupler method, grating coupler method, holographic coupler method, tapered coupler method and the like.

The present invention is then explained by means of examples, but is not limited to them.

In the following Examples and Preparation Examples, equipment and measuring conditions used for evaluation of physical properties are as follows.

(1) NMR: NMR analyzer is AC-300 available from BRUKER CO., LTD. Measuring conditions of $^1$H-NMR: 300 MHz (tetramethylsilane=0 ppm) Measuring conditions of $^{19}$F-NMR: 300 MHz (trichlorofluoromethane=0 ppm)

(2) IR analysis: Measuring is carried out at room temperature with a Fourier-transform infrared spectrophotometer 1760X available from Perkin Elmer Co., Ltd.

(3) GPC: A number average molecular weight is calculated from data measured by gel permeation chromatography (GPC) by using GPC HLC-8020 available from Toso Kabushiki Kaisha and columns available from Shodex Co., Ltd. (one GPC KF-801, one GPC KF-802 and two GPC KF-806M were connected in series) and flowing tetrahydrofuran (THF) as a solvent at a flowing rate of 1 ml/minute.

PREPARATION EXAMPLE 1

(Synthesis of Homopolymer of Fluorine-containing Allyl Ether Having OH Group)

A 100 ml four-necked glass flask equipped with a stirrer and thermometer was charged with 20.4 g of perfluoro-(1,1,9,9-tetrahydro-2,5-bistrifluoromethyl-3,6-dioxanonenol):

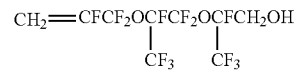

and 21.2 g of a perfluorohexane solution of 8.0% by weight of:

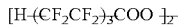

and after the inside of the flask was sufficiently replaced with nitrogen gas, stirring was carried out at 20° C. for 24 hours in nitrogen gas stream and a solid having a high viscosity was produced.

The obtained solid was dissolved in diethyl ether and then poured into perfluorohexane, followed by separating and vacuum-drying to obtain 17.6 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 9,000 according to the GPC analysis using tetrahydrofuran (THF) as a solvent and the weight average molecular weight thereof was 22,000.

PREPARATION EXAMPLE 2

(Synthesis of Copolymer of Fluorine-containing Allyl Ether Having OH Group)

A 100 ml four-necked glass flask equipped with a stirrer and thermometer was charged with 9.6 g of perfluoro-(1,1, 9,9-tetrahydro-2,5-bistrifluoromethyl-3,6-dioxanonenol):

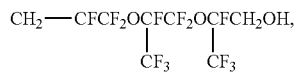

and 9.6 g of methyl 9H,9H-perfluoro-2,5-dimethyl-3,6-dioxa-8-nonenoate:

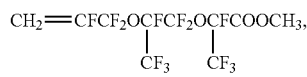

followed by stirring sufficiently and then adding 2.0 g of a perfluorohexane solution of 8.0% by weight of:

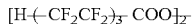

and after the inside of the flask was sufficiently replaced with nitrogen gas, stirring was carried out at 20° C. for 20 hours in nitrogen gas stream and a solid having a high viscosity was produced.

The obtained solid was dissolved in acetone and poured into a solution of HCFC225/n-hexane=1/1, followed by separating and vacuum-drying to obtain 15.5 g of a transparent colorless polymer.

According to $^{19}$F-NMR, $^1$H-NMR and IR analyses, the polymer was a fluorine-containing polymer comprising the structural unit of the above-mentioned fluorine-containing allyl ether having hydroxyl and the structural unit of the fluorine-containing allyl ether having methyl ester structure.

The ratio thereof was 42:58 (mole ratio) according to NMR analysis.

The number average molecular weight of the polymer was 7,200 according to the GPC analysis using tetrahydrofuran (THF) as a solvent and the weight average molecular weight thereof was 11,000.

PREPARATION EXAMPLE 3

(Synthesis of Curable Fluorine-containing Polymer Having α-fluoroacryloyl Group)

A 200 ml four-necked flask equipped with a reflux condenser, thermometer, stirrer and dropping funnel was charged with 80 ml of diethyl ether, 5.0 g of the fluorine-containing allyl ether homopolymer having hydroxyl which was obtained in Preparation Example 1 and 1.0 g of pyridine, followed by cooling to 5° C. or lower with ice.

A solution obtained by dissolving 1.0 g of α-fluoroacrylic acid fluoride $CH_2=CFCOF$ in 20 ml of diethyl ether was added thereto dropwise over about 30 minutes while stirring in nitrogen gas stream.

After completion of the addition, the flask temperature was raised to room temperature and the stirring was further continued for 4.0 hours.

The ether solution after the reaction was put in the dropping funnel, followed by washing with water, 2% hydrochloric acid solution, 5% NaCl solution and water and then drying with anhydrous magnesium sulfate. Then the ether solution was filtered for separation.

According to $^{19}$F-NMR analysis of the ether solution, a conversion was nearly 100%.

The ether solution was coated on a NaCl plate and formed into a cast film at room temperature. According to IR analysis of the cast film, an absorption of a carbon-carbon double bond was observed at 1,661 cm$^{-1}$, and an absorption of C=O group was observed at 1,770 cm$^{-1}$.

PREPARATION EXAMPLE 4

(Synthesis of Curable Fluorine-containing Polymer Having α-fluoroacryloyl Group)

A curable fluorine-containing polymer (ether solution) was synthesized in the same manner as in Preparation Example 3 except that the copolymer of fluorine-containing allyl ether having hydroxyl which was obtained in Preparation Example 2 was used.

According to $^{19}$F-NMR analysis, a conversion was nearly 100%.

According to IR analysis, an absorption of a carbon-carbon double bond and an absorption of C=O group were observed at the same positions, respectively as in Preparation Example 3.

REFERENCE EXAMPLES 1 to 2

(Physical Properties of Cured Article)

(1) Preparation of Fluorine-containing Resin Composition

After methyl ethyl ketone (MEK) was added to the fluorine-containing polymers (ether solutions) having α-fluoroacryloyl group which were obtained in Preparation Example 3 (Reference Example 1) and Preparation Example 4 (Reference Example 2), ether was distilled off with an evaporator to adjust concentrations of the respective polymers to 50% by weight.

To 10 g of the obtained polymer solution was added, as an active energy curing initiator, 0.1 g of 2-hydroxy-2-methylpropiophenone.

(2) Measurement of Refractive Index of Curable Fluorine-containing Polymer

The 8% MEK solution of the curable fluorine-containing polymer (the polymer solution before adding the curing catalyst in (1) above) was coated on a PET film with an applicator so that a coating thickness after the drying became about 100 μm. After vacuum-drying at 50° C. for ten minutes, the obtained cast film was peeled from the PET film and a refractive index thereof was measured using an Abbe's refractometer at 25° C. with light having a wavelength of 550 nm. The results are shown in Table 1.

(3) Measurement of Refractive Index of Cured Film

The composition prepared in (1) above was coated on an aluminum foil with an applicator so that a coating thickness became about 100 μm, followed by vacuum-drying at 50° C. for ten minutes. After the drying, the coating film was irradiated with ultraviolet light using a high pressure mercury lamp at room temperature at an intensity of 1,000 mJ/cm$^2$U and, the aluminum foil was melted with diluted hydrochloric acid to obtain a sample film. A refractive index of the obtained cured film was measured in the same manner as in (2) above.

(7) Evaluation of Heat Resistance

Each sample was allowed to stand at 150° C. for one hour and a change in its form was observed.

(8) Measurement of Thermal Decomposition Temperature

Measurement was made in nitrogen gas atmosphere at a temperature raising rate of 10° C./min using a thermogravimeter "TGA-50 (available from Shimadzu Corporation)". The thermal decomposition temperature is shown by a temperature where the weight of the film was reduced by 10% by weight. The results are shown in Table 1.

COMPARATIVE REFERENCE EXAMPLE 1

With respect to the un-cured article of fluorine-containing polymer having α-fluoroacryloyl group which was obtained in Preparation Example 3, physical properties were determined. The results are shown in Table 1.

TABLE 1

|  | Ref. Ex. 1 | Ref. Ex. 2 | Com. Ref. Ex. 1 |
|---|---|---|---|
| Pre-polymer | Prep. Ex. 3 | Prep. Ex. 4 | Prep. Ex. 3 |
| Fluorine content (%) | 55 | 56 | 55 |
| Active energy curing initiator | 2-Hydroxy-2-methylpropiophenone | 2-Hydroxy-2-methylpropiophenone | 2-Hydroxy-2-methylpropiophenone |
| Ratio of initiator to polymer (% by weight) | 2.1 | 2.1 | 2.1 |
| Amount of ultraviolet irradiation (mJ/cm$^2$) | 3,000 | 3,000 | Not irradiated |
| Refractive index |  |  |  |
| Before curing | 1.362 | 1.359 | — |
| After curing | 1.366 | 1.364 | — |
| Absorption coefficient cm$^{-1}$ |  |  |  |
| 650 nm | 0.025 | 0.018 | 0.022 |
| 1,310 nm | 0.048 | 0.031 | 0.045 |
| 1,550 nm | 0.311 | 0.213 | 0.282 |
| Solubility in solvent | ○ | ○ | X |
| Heat resistance | ○ | ○ | X |
| Thermal decomposition temperature (° C.) | 311 | 318 | — |

(4) Measurement of Light Transmittance

The composition prepared in (1) above was coated on an aluminum foil with an applicator so that a coating thickness became about 1 mm, followed by vacuum-drying at 50° C. for ten minutes. After the drying, the coating film was irradiated with ultraviolet light using a high pressure mercury lamp at room temperature at an intensity of 1,000 mJ/cm$^2$U and, the aluminum foil was melted with diluted hydrochloric acid to obtain a sample film. Light absorption (absorption coefficient) of the obtained cured film was measured using a spectrophotometer U3410 available from Hitachi, Ltd. with light having a wavelength of 650 nm, 1,310 nm and 1,550, respectively. The results are shown in Table 1.

(5) Measurement of Solubility in Solvent

The solubility in a solvent before and after the light irradiation was compared. The results are shown in Table 1.

(6) Measurement with DSC

Measurement was made at a temperature raising rate of 10° C./min using a differential calorimeter "DSC-50 (available from Shimadzu Corporation)", and it was found that any samples were non-crystalline.

It can be seen from the above-mentioned results that the curable fluorine-containing prepolymer of the present invention is a material which can be subjected to photo-curing and photolithographing and can give a cured article having a high transparency and excellent heat resistance.

EXAMPLE 1

(Synthesis 1 of Fluorine-containing Resin Composition Containing Nonlinear Substance)

A 100 ml four-necked glass flask equipped with a stirrer and thermometer was charged with 2.09 g of fluorine-containing allyl ether homopolymer having α-fluoroacryloyl group which was obtained in Preparation Example 3 and 15 g of methanol, and then a solution obtained by dissolving 0.5 g (3.3 mmol) of 2-methyl-4-nitroaniline in 10 g of pyridine was added thereto dropwise over five minutes with stirring. After completion of the addition, 2-hour stirring was carried out, followed by allowing to stand for 30 minutes to precipitate a produced viscous solid. The supernatant methanol solution was removed by decantation and the solid was washed with acetone three times and then vacuum-dried at 60° C. for 12 hours to obtain 1.7 g of a colorless transparent solid.

EXAMPLE 2

(Synthesis 2 of Fluorine-containing Resin Composition Containing Nonlinear Substance)

The fluorine-containing resin composition containing a nonlinear substance as a colorless transparent solid was prepared in an amount of 1.93 g in the same manner as in Example 1 except that the fluorine-containing allyl ether copolymer having α-fluoroacryloyl group which was obtained in Preparation Example 4 was used.

PREPARATION EXAMPLE 5

(Synthesis of Fluorine-containing Allyl Ether Having COCl Group)

In a solution of a mixture comprising 9H,9H-perfluoro-2,5-dimethyl-3,6-dioxa-8-nonenoic acid (422 g, 10 mole):

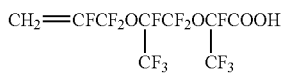

and dimethylformamide (7.4 g, 0.1 mole) was added dropwise $SOCl_2$ (143 g, 1.2 mole) at 80° C. with stirring. Then the reaction solution was heated up to 100° C., followed by stirring for six hours. A distiller was fit to the reactor and $SOCl_2$ was distilled off under reduced pressure. After that, the pressure was further reduced and the crude product of 9H,9H-perfluoro-2,5-dimethyl-3,6-dioxa-8-nonenoic acid chloride was removed. This solution was washed with concentrated sulfuric acid and distilled under reduced pressure of 60 mHg to obtain 9H,9H-perfluoro-2,5-dimethyl-3,6-dioxa-8-nonenoic acid chloride:

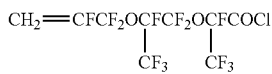

(441 g, 0.91 mole, 91% of yield) having a boiling point of 50° C.

PREPARATION EXAMPLE 6

(Synthesis 1 of Allyl Ether Containing Nonlinear Substance in Side Chain)

In nitrogen gas atmosphere, 4-nitroaniline (1.4 g, 10 mmol) was dissolved in 15 ml of pyridine and was cooled to 0° C. with stirring. To the solution was added dropwise 9H,9H-perfluoro-2,5-dimethyl-3,6-dioxa-8-nonenoic acid chloride (4.4 g, 10 mmol) and after completion of the addition, stirring was carried out for one hour at room temperature. After the reaction, the reaction solution was put in hexane and a precipitated solid was removed by filtering. The solid was re-crystallized from acetone, and N-(4'-nitrophenyl)9H,9H-perfluoro-2,5-dimethyl-3,6-dioxa-8-nonenoic acid amide:

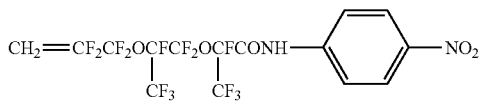

(1.2 g, 2.2 mmol, 22% of yield) was obtained.

PREPARATION EXAMPLE 7

(Synthesis 2 of Allyl Ether Containing Nonlinear Substance in Side Chain)

In nitrogen gas atmosphere, 2-methyl-4-nitroaniline (1.5 g, 10 mmol) was dissolved in 15 ml of pyridine and was cooled to 0° C. with stirring. To the solution was added dropwise 9H,9H-perfluoro-2,5-dimethyl-3,6-dioxa-8-nonenoic acid chloride (4.4 g, 10 mmol) and after completion of the addition, stirring was carried out for one hour at room temperature. After the reaction, the reaction solution was put in hexane and a precipitated solid was removed by filtering. The solid was re-crystallized from acetone, and N-(2'-methyl-4'-nitrophenyl)9H,9H-perfluoro-2,5-dimethyl-3,6-dioxa-8-nonenoic acid amide:

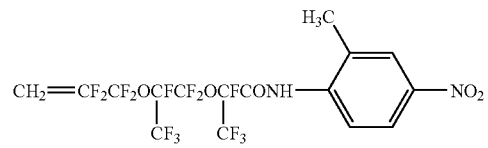

(1.3 g, 2.3 mmol, 23% of yield) was obtained.

PREPARATION EXAMPLE 8

(Synthesis 3 of Allyl Ether Containing Nonlinear Substance in Side Chain)

In nitrogen gas atmosphere, 2-methoxy-4-nitroaniline (1.7 g, 10 mmol) was dissolved in 15 ml of pyridine and was cooled to 0° C. with stirring. To the solution was added dropwise 9H,9H-perfluoro-2,5-dimethyl-3,6-dioxa-8-nonenoic acid chloride (4.4 g, 10 mmol) and after completion of the addition, stirring was carried out for one hour at room temperature. The reaction solution was put in hexane and a precipitated solid was removed by filtering. The solid was re-crystallized from acetone, and N-(2'-methoxy-4'-nitrophenyl)9H,9H-perfluoro-2,5-dimethyl-3,6-dioxa-8-nonenoic acid amide:

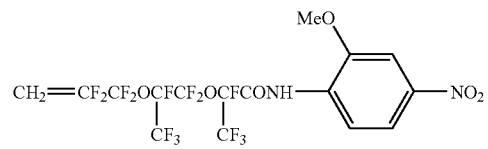

(1.3 g, 2.3 mmol, 23% of yield) was obtained.

PREPARATION EXAMPLE 9

(Synthesis 4 of Allyl Ether Containing Nonlinear Substance in Side Chain)

In nitrogen gas atmosphere, N-methyl-4-nitroaniline (1.5 g, 10 mmol) was dissolved in 15 ml of pyridine and was cooled to 0° C. with stirring. To the solution was added dropwise 9H,9H-perfluoro-2,5-dimethyl-3,6-dioxa-8-nonenoic acid chloride (4.4 g, 10 mmol) and after completion of the addition, stirring was carried out for one hour at room temperature. The reaction solution was put in hexane and a precipitated solid was removed by filtering. The solid was re-crystallized from acetone, and N-methyl,N-(4'-nitrophenyl)9H,9H-perfluoro-2,5-dimethyl-3,6-dioxa-8-nonenoic acid amide:

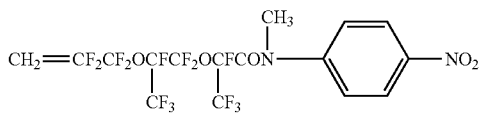

(2.5 g, 4.5 mmol, 45% of yield) was obtained.

PREPARATION EXAMPLE 10

(Synthesis 5 of Allyl Ether Containing Nonlinear Substance in Side Chain)

To 1H,1H,9H,9H-perfluoro-2,5-dimethyl-3,6-dioxa-8-nonene-1-ol (4.1 g, 10 mmol):

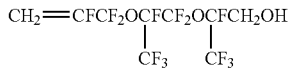

were added sodium hydroxide (20 mg) and 37% aqueous solution of formaldehyde (1.0 g, 10 mmol), followed by stirring at room temperature for 30 minutes. To the reaction solution was added 4-nitroaniline (1.4 g, 10 mmol) and stirring was carried out at room temperature for three hours. Then the reaction solution was put in water and thereto was added ethyl acetate, followed by washing. After drying an organic phase with magnesium sulfate, the solvent was removed under reduced pressure. The precipitated solid was re-crystallized from ethanol, and (1H,1H,9H,9H-perfluoro-2,5-dimethyl-3,6-dioxa-8-noneoxy)methyl-4-nitroaniline:

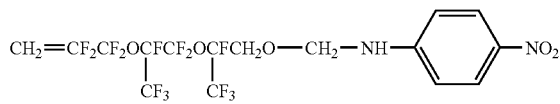

(2.5 g, 4.5 mmol, 45% of yield) was obtained.

PREPARATION EXAMPLE 11

(Synthesis of Copolymer of Fluorine-containing Allyl Ether Having OH Group and Fluorine-containing Allyl Ether Containing Nonlinear Substance in Side Chain)

A 100 ml four-necked glass flask equipped with a stirrer and thermometer was charged with 10 g of perfluoro-(1,1,9,9-tetrahydro-2,5-bistrifluoromethyl-3,6-dioxanonenol):

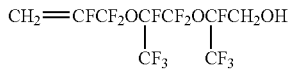

and 10 g of N-(4'-nitrophenyl)9H,9H-perfluoro-2,5-dimethyl-3,6-dioxa-8-nonenoic acid amide of Preparation Example 6, followed by stirring sufficiently. Then thereto was added 2.0 g of a perfluorohexane solution of 8.0% by weight of:

and after the inside of the flask was sufficiently replaced with nitrogen gas, stirring was carried out at 20° C. for 20 hours in nitrogen gas stream and a solid having a high viscosity was produced.

The obtained solid was dissolved in acetone and then poured into a solution of HCFC225/n-hexane=1:1, followed by separating and vacuum-drying to obtain 14.8 g of a transparent colorless polymer.

According to $^{19}$F-NMR, $^1$H-NMR and IR analyses, the polymer was a fluorine-containing polymer comprising the structural unit of the above-mentioned fluorine-containing allyl ether having hydroxyl and the structural unit of the above-mentioned fluorine-containing allyl ether containing a nonlinear substance in its side chain structure.

The ratio thereof was 47:53 (mole ratio) according to NMR analysis.

The number average molecular weight of the polymer was 8,400 according to the GPC analysis using tetrahydrofuran (THF) as a solvent and the weight average molecular weight thereof was 13,000.

EXAMPLE 3

(Synthesis 3 of Fluorine-containing Resin Composition Containing Nonlinear Material)

A curable fluorine-containing polymer (ether solution) containing a nonlinear substance in its side chain structure was prepared in the same manner as in Preparation Example 3 except that the copolymer comprising the fluorine-containing allyl ether having hydroxyl and the fluorine-containing allyl ether containing a nonlinear substance in its side chain structure which was obtained in Preparation Example 11 was used.

EXAMPLE 4

(Synthesis 4 of Fluorine-containing Resin Composition Containing Nonlinear Material)

A copolymer comprising a fluorine-containing allyl ether having hydroxyl and a fluorine-containing allyl ether containing a nonlinear substance in its side chain structure was prepared in the same manner as in Preparation Example 11 except that the fluorine-containing allyl ether containing a nonlinear substance in its side chain which was obtained in Preparation Example 7 was used. The ratio thereof was 40:60 (mole ratio) according to NMR analysis. The number average molecular weight of the polymer was 7,200 according to the GPC analysis and the weight average molecular weight thereof was 12,500. Further a curable fluorine-containing polymer (ether solution) containing a nonlinear substance in its side chain structure was prepared in the same manner as in Preparation Example 3.

EXAMPLE 5

(Synthesis 5 of Fluorine-containing Resin Composition Containing Nonlinear Material)

A copolymer comprising a fluorine-containing allyl ether having hydroxyl and a fluorine-containing allyl ether containing a nonlinear substance in its side chain structure was prepared in the same manner as in Preparation Example 11 except that the fluorine-containing allyl ether containing a nonlinear substance in its side chain which was obtained in Preparation Example 8 was used. The ratio thereof was 42:58 (mole ratio) according to NMR analysis. The number average molecular weight of the polymer was 6,500 according to the GPC analysis and the weight average molecular weight thereof was 13,000. Further a curable fluorine-containing polymer (ether solution) containing a nonlinear substance in its side chain structure was prepared in the same manner as in Preparation Example 3.

EXAMPLE 6

(Synthesis 6 of Fluorine-containing Resin Composition Containing Nonlinear Material)

A copolymer comprising a fluorine-containing allyl ether having hydroxyl and a fluorine-containing allyl ether containing a nonlinear substance in its side chain structure was prepared in the same manner as in Preparation Example 11 except that the fluorine-containing allyl ether containing a nonlinear substance in its side chain which was obtained in Preparation Example 9 was used. The ratio thereof was 46:54 (mole ratio) according to NMR analysis. The number average molecular weight of the polymer was 5,700 according to the GPC analysis and the weight average molecular weight thereof was 12,000. Further a curable fluorine-containing polymer (ether solution) containing a nonlinear substance in its side chain structure was prepared in the same manner as in Preparation Example 3.

EXAMPLE 7

(Synthesis 7 of Fluorine-containing Resin Composition Containing Nonlinear Material)

A copolymer comprising a fluorine-containing allyl ether having hydroxyl and a fluorine-containing allyl ether containing a nonlinear substance in its side chain structure was prepared in the same manner as in Preparation Example 11 except that the fluorine-containing allyl ether containing a nonlinear substance in its side chain which was obtained in Preparation Example 10 was used. The ratio thereof was 41:59 (mole ratio) according to NMR analysis. The number average molecular weight of the polymer was 7,700 according to the GPC analysis and the weight average molecular weight thereof was 14,000. Further a curable fluorine-containing polymer (ether solution) containing a nonlinear substance in its side chain structure was prepared in the same manner as in Preparation Example 3.

EXAMPLES 8 to 14

(Determination of Curing Reactivity by IR Analysis)

(1) Preparation of Fluorine-containing Resin Composition for Coating

Coating compositions were prepared using the curable fluorine-containing polymer compositions obtained in Examples 1 to 7, respectively by the same procedures as in Reference Example 1 so that the concentration of polymer and the amount of active energy curing initiator became those shown in Table 2.

(2) Production of Film for IR Analysis

The above-mentioned coating compositions were coated on a PET film with an applicator so that a coating thickness after drying became about 100 μm, followed by drying at 50° C. for five minutes. Then the obtained coating films were peeled from the PET film to obtain cast films.

(3) Measurement of Curing Reactivity by IR Analysis

According to IR analysis of the films, an absorption of a carbon-carbon double bond in the polymer was observed at 1,661 cm$^{-1}$.

Attention was directed to the absorption of the carbon-carbon double bond, and a change in intensity of the absorption after the light irradiation was measured. A ratio of curing reaction was calculated by the following equation.

$$\left(1 - \frac{\text{Peak height at 1,661 cm}^{-1} \text{ after light irradiation}}{\text{Peak height at 1,661 cm}^{-1} \text{ before light irradiation}}\right) \times 100\%$$

The films were irradiated with ultraviolet light at room temperature in irradiation amounts shown in Table 2 using a high pressure mercury lamp, and the ratio of curing reaction represented by the above equation was calculated. The results are shown in Table 2.

TABLE 2

|  | Ex. 8 | Ex. 9 | Ex. 10 | Ex. 11 |
|---|---|---|---|---|
| Curable fluorine-containing polymer | Ex. 1 | Ex. 2 | Ex. 3 | Ex. 4 |
| Content of —O(C=O)CF=CH$_2$ group (% by mole) | 42 | 42 | 47 | 40 |
| Solvent | MEK | MEK | MEK | MEK |
| Concentration of polymer (% by weight) | 8 | 8 | 8 | 8 |
| Active energy curing initiator | 2-Hydroxy-2-methylpropiophenone | 2-Hydroxy-2-methylpropiophenone | 2-Hydroxy-2-methylpropiophenone | 2-Hydroxy-2-methylpropiophenone |
| Ratio of initiator to polymer (% by weight) | 4.2 | 2.1 | 4.0 | 4.1 |
| Ratio of curing reaction (%) |  |  |  |  |
| Amount of ultraviolet irradiation (mJ/cm$^2$) |  |  |  |  |
| 100 | 100 (disappeared) | 55 | 100 (disappeared) | 100 (disappeared) |
| 500 | — | 75 | — | — |
| 1,500 | — | 100 (disappeared) | — | — |

TABLE 2-continued

|  | Ex. 12 | Ex. 13 | Ex. 14 |
|---|---|---|---|
| Curable fluorine-containing polymer | Ex. 5 | Ex. 6 | Ex. 7 |
| Content of —O(C=O)CF=CH$_2$ group (% by mole) | 42 | 46 | 41 |
| Solvent | MEK | MEK | MEK |
| Concentration of polymer (% by weight) | 8 | 8 | 8 |
| Active energy curing initiator | 2-Hydroxy-2-methylpropiophenone | 2-Hydroxy-2-methylpropiophenone | 2-Hydroxy-2-methylpropiophenone |
| Ratio of initiator to polymer (% by weight) | 4.0 | 4.2 | 4.1 |
| Ratio of curing reaction (%) Amount of ultraviolect irradiation (mJ/cm$^2$) | | | |
| 100 | 100 (disappeared) | 100 (disappeared) | 100 (disappeared) |
| 500 | — | — | — |
| 1,500 | — | — | — |

PREPARATION EXAMPLE 12

(Synthesis of Curable Fluorine-containing Polymer Having α-fluoroacryloyl Group)

A curable fluorine-containing polymer (ether solution) was synthesized in the same manner as in Preparation Example 3 except that 2.0 g of α-fluoroacrylic acid fluoride (CH$_2$=CFCOF) and 2.0 g of pyridine were used.

According to $^{19}$F-NMR analysis of the ether solution, the polymer was a copolymer comprising the fluorine-containing allyl ether having

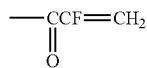

group and a fluorine-containing allyl ether having OH group in a ratio of 84:16% by mole.

According to IR analysis, an absorption of a carbon-carbon double bond and an absorption of C=O group were observed at the same positions as in Preparation Example 3, respectively.

EXAMPLE 15

(Synthesis of Fluorine-containing Resin Composition Containing Nonlinear Material)

A fluorine-containing resin composition containing a non-linear material in the form of colorless transparent solid was prepared in an amount of about 2 g in the same manner as in Example 1 except that the copolymer of fluorine-containing allyl ether having α-fluoroacryloyl group which was obtained in Preparation Example 12 was used.

EXAMPLES 16 to 18

(Determination of Curing Reactivity by IR Analysis)

(1) Preparation of Photo-curable Fluorine-containing Resin Composition

Respective compositions were prepared using the curable fluorine-containing polymer obtained in Example 15 by the same procedures as in Example 1 so that the concentrations of polymer and kinds and amounts of active energy curing initiators became those shown in Table 3.

(2) Production of Film for IR Analysis

The films were produced in the same manner as in Example 8.

(3) Measurement of Ratio of Curing Reaction by IR Analysis

A ratio of curing reaction when light irradiation was carried out in an irradiation amount of 1,500 mJ/cm$^2$ was calculated in the same manner as in Example 8. The results are shown in Table 3.

EXAMPLE 19

A photo-curable fluorine-containing resin composition was prepared by adding, as a curing agent,

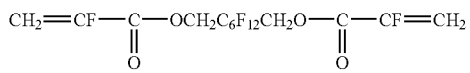

to the photo-curable composition obtained in Example 16 so that the amount thereof became 20% by weight based on the polymer.

A film for IR analysis was produced using this resin composition in the same manner as in Example 16, and a ratio of curing reaction was determined. The results are shown in Table 3.

TABLE 3

|  | Ex. 16 | Ex. 17 | Ex. 18 | Ex. 19 |
|---|---|---|---|---|
| Curable fluorine-containing polymer | Ex. 15 | Ex. 15 | Ex. 15 | Ex. 15 |

TABLE 3-continued

|  | Ex. 16 | Ex. 17 | Ex. 18 | Ex. 19 |
|---|---|---|---|---|
| Content of —O(C=O)CF=CH$_2$ group (% by mole) | 84 | 84 | 84 | 84 |
| Solvent | MEK | MEK | MEK | MEK |
| Concentration of polymer (% by weight) | 8 | 8 | 8 | 8 |
| Active energy curing initiator | 2-Hydroxy-2-methylpropiophenone | 2,2-Dimethoxy-2-phenyl acetophenone | Benzophenone | 2-Hydroxy-2-methylpropiophenone |
| Ratio of initiator to polymer (% by weight) | 2.0 | 2.0 | 2.0 | 2.0 |
| Curing agent | — | — | — | Polyfunctional acryl[1] |
| Ratio of curing agent to the polymer (% by weight) | — | — | — | 20 |
| Ratio of curing reaction (%) (at 1,500 mJ/cm$^2$) | 77.1 | 60.7 | 38.0 | 86.8 |

[1] Polyfunctional acryl: $CH_2=CF(C=O)OCH_2—(CF_2)_6—CH_2O(C=O)CF=CH_2$

PREPARATION EXAMPLE 13

(Synthesis of Fluorine-containing Allyl Ether Homopolymer Having OH Group)

Synthesis of a polymer and refining of the obtained polymer were carried out in the same manner as in Preparation Example 1 except that 20.0 g of perfluoro-(1,1,9,9-tetrahydro-2,5-bistrifluoromethyl-3,6-dioxanonenol) and 10.0 g of a perfluorohexane solution of 8.0% by weight of:

were used. Thus 18.2 g of a transparent colorless polymer was obtained.

According to $^{19}$F-NMR, $^1$H-NMR and IR analyses, the obtained polymer was a fluorine-containing polymer consisting of the structural unit of the above-mentioned fluorine-containing allyl ether and having hydroxyl at an end of its side chain. The number average molecular weight of the polymer was 30,000 according to the GPC analysis using tetrahydrofuran (THF) as a solvent and the weight average molecular weight thereof was 59,000.

PREPARATION EXAMPLE 14

(Synthesis of Copolymer Comprising Fluorine-containing Allyl Ether Having OH Group and Vinylidene Fluoride)

A 300 ml stainless steel autoclave equipped with a valve, pressure gauge and thermometer was charged with 34.2 g of perfluoro-(1,1,9,9-tetrahydro-2,5-bistrifluoromethyl-3,6-dioxanonenol), 200 g of CH$_3$CCl$_2$F (HCFC-141b) and 0.16 g of methanol solution of 50% by weight of dinormalpropyl peroxycarbonate (NPP). While cooling with dry ice/methanol solution, the inside of a system was sufficiently replaced with nitrogen gas. Then 5.8 g of vinylidene fluoride (VdF) was introduced through the valve, followed by reacting while shaking at 40° C. With the advance of the reaction, 12 hours after starting of the reaction, a gauge pressure inside the system lowered from 4.4 MPaG (4.5 kgf/cm$^2$G) before the reaction to 0.98 MPaG (1.0 kgf/cm$^2$G).

At that time, un-reacted monomer was released and a precipitated solid was removed and dissolved in acetone, followed by re-precipitation with a solvent mixture of hexane and toluene (50/50) to separate a copolymer. The copolymer was vacuum-dried until a constant weight was reached. As a result, 31.2 g of a copolymer was obtained.

The components of the copolymer were VdF and the fluorine-containing allyl ether having OH group in a ratio of 55:45% by mole according to $^1$H-NMR and $^{19}$F-NMR analyses. The number average molecular weight of the copolymer was 12,000 according to the GPC analysis using THF as a solvent and the weight average molecular weight thereof was 18,000.

PREPARATION EXAMPLE 15

(Synthesis of Fluorine-containing Active Energy Curing Initiator)

A 200 ml four-necked flask equipped with a reflux condenser, thermometer, stirrer and dropping funnel was charged with 2.0 g of 2-hydroxy-2-methylpropiophenone, 1.0 g of pyridine and 20 g of a mixture (HCFC-225) of CF$_3$CF$_2$CHCl/CClF$_2$CF$_2$CHClF and was cooled to 5° C. or lower with ice.

Thereto was added dropwise 2.5 g of:

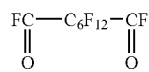

over one hour with stirring in nitrogen gas stream. After completion of the addition, the stirring was further continued for 4.0 hours.

After the reaction, the ether solution was put in the dropping funnel and washed with 2% hydrochloric acid solution and 5% NaCl solution, followed by separating an organic layer, drying with anhydrous magnesium sulfate and distilling to isolate 2.6 g of a product (yield: 62%).

According to $^1$H-NMR, $^{19}$F-NMR and IR analyses, the product was:

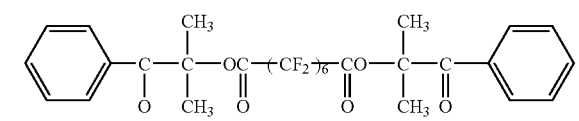

PREPARATION EXAMPLE 16

(Synthesis of Curable Fluorine-containing Polymer Having α-fluoroacryloyl Group)

A 200 ml four-necked flask equipped with a reflux condenser, thermometer, stirrer and dropping funnel was charged with 40 ml of methyl ethyl ketone (MEK), 5.0 g of the fluorine-containing allyl ether homopolymer having hydroxyl which was obtained in Preparation Example 13 and 2.0 g of pyridine, and was cooled to 5° C. or lower with ice.

Thereto was added dropwise 1.2 g of α-fluoroacrylic acid fluoride over about 30 minutes with stirring in nitrogen gas stream. After completion of the addition, the flask temperature was raised to room temperature and the stirring was further continued for 4.0 hours.

After the reaction, the MEK solution was put in the dropping funnel and washed with water, 2% hydrochloric acid solution, 5% NaCl solution and water, followed by separating an organic layer and drying with anhydrous magnesium sulfate. A concentration of the polymer after filtrating was 10.7% by weight.

According to $^{19}$F-NMR analysis of the MEK solution, the obtained polymer was one comprising the fluorine-containing allyl ether having

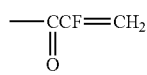

group and the fluorine-containing allyl ether having OH group in a ratio of 89:11% by mole.

According to IR analysis which was carried out in the same manner as in Preparation Example 3, an absorption of a carbon-carbon double bond and an absorption of C=O group were observed at 1,660 cm$^{-1}$ and 1,770 cm$^{-1}$, respectively.

PREPARATION EXAMPLE 17

(Synthesis of Curable Fluorine-containing Polymer Having α-fluoroacryloyl Group)

A curable fluorine-containing polymer (MEK solution) was synthesized in the same manner as in Preparation Example 16 except that 5.0 g of the copolymer of fluorine-containing allyl ether having OH group and VdF which was obtained in Preparation Example 14, 1.1 g of pyridine and 1.0 g of α-fluoroacrylic acid fluoride were used. A concentration of the polymer was 9.9% by weight.

According to $^{19}$F-NMR analysis of the polymer, a conversion was nearly 100%.

EXAMPLE 20

(1) Preparation of Photo-curable Fluorine-containing Resin Composition Containing Nonlinear Material To the curable fluorine-containing polymer (MEK solution) obtained in Preparation Example 16 was further added MEK to adjust the polymer concentration to 8% by weight. Further thereto was dissolved 2-methyl-4-nitroaniline so that its concentration became 1% by weight.

To this MEK solution of curable fluorine-containing polymer containing the nonlinear material was added 2-hydroxy-2-methylpropiophenone as an active energy curing initiator so that its amount became 2.0% by weight based on the polymer, but the solution became turbid in white and there was no compatibility therebetween.

Therefore the fluorine-containing active energy curing initiator obtained in Preparation Example 15 was added instead of 2-hydroxy-2-methylpropiophenone so that its amount became 4.0% by weight based on the polymer. As a result, a transparent colorless solution was obtained and there was compatibility therebetween.

(2) Evaluation of Nonlinearity

The curable fluorine-containing polymer which was obtained in Preparation Example 3 was molded into a thickness of 3 mm and was irradiated for curing with ultraviolet light at room temperature at an intensity of 3,000 mJ/cm$^2$U to obtain a substrate. Then the substrate was ground in the form of a plane mirror and the solution of photo-curable composition obtained above was coated thereon by a spin coating method to form a thin film, and thereby a nonlinear optical device was produced.

(i) Measurement of Refractive Index

A refractive index at a wavelength of 1.06 μm (Nd:YAG laser) was measured by a prism coupler method. The results are shown in Table 4.

(ii) Measurement of Second Harmonic

When Nd:YAG laser (wavelength of 1.06 μm) was introduced to the so-produced nonlinear optical device, a blue light of the second harmonic (wavelength of 0.53 μm) was observed. A conversion efficiency was about 10$^{-4}$%. The results are shown in Table 4.

(iii) Durability Test

The sample was stored for one week under environment of a temperature of 80° C. and a humidity of 85%, but there was recognized no lowering of conversion efficiency at all. The results are shown in Table 4.

EXAMPLE 21

(1) Preparation of Photo-curable Fluorine-containing Resin Composition Containing Nonlinear Material To the curable fluorine-containing polymer (MEK solution) obtained in Preparation Example 17 was further added MEK to adjust the polymer concentration to 8% by weight. Further thereto was dissolved 2-methyl-4-nitroaniline so that a concentration of the complex became 1% by weight. To this MEK solution of curable fluorine-containing polymer was added 2-hydroxy-2-methylpropiophenone as an active energy curing initiator so that its amount became 5.2% by weight based on the polymer. As a result, a transparent colorless solution was obtained and there was compatibility therebetween.

(2) Evaluation of Nonlinearity

Nonlinearity was evaluated in the same manner as in Example 20. The results are shown in Table 4.

TABLE 4

|  | Example 20 | Example 21 |
| --- | --- | --- |
| Prepolymer | Prep. Ex. 3 | Prep. Ex. 17 |
| Refractive index | 1.42 | 1.41 |
| Second harmonic | Recognized | Recognized |
| Conversion efficiency | 10$^{-4}$ | 10$^{-4}$ |
| Durability test | No lowering | No lowering |

EXAMPLE 22

(Production of Optical Waveguide Device)

Mach Zehnder interferometer type optical device was produced as shown in the diagrammatic perspective view of FIG. 1.

First, the curable fluorine-containing prepolymer obtained in Preparation Example 3 was dissolved in MEK and coated on a silicon substrate 5 provided with a bottom (gold) electrode 6 by a spin coating method to form a film (film thickness: 10 μm). The film was then cured by irradiation of ultraviolet light at room temperature at an intensity of 3,000 mJ/cm$^2$U to form an under-clad layer 7. On the under-clad layer 7 was coated, by a spin coating method, the fluorine-containing resin composition solution for nonlinear optical material which was prepared in Example 20, to form a thin film (film thickness: 4 μm). Next, on the surface of the fluorine-containing resin film as a nonlinear optical material for optical waveguide was coated again, by a spin coating method, the curable fluorine-containing prepolymer prepared in Preparation Example 3 to form a cured film. Further on the necessary parts of the obtained film was provided a top (gold) electrode 2. The substrate 5 was heated to 110° C. and an electric field of 1 MV/cm was applied between the top electrode 2 and the bottom electrode 6 for two minutes for orientation treatment of the thin film of the nonlinear material. After slowly cooling the substrate to 30° C., the electric field was shut off. Then after removing the top electrode 2, the thin film of the nonlinear material for optical waveguide was irradiated with ultraviolet light using a necessary mask of waveguide pattern to cure the fluorine-containing resin portion corresponding to the optical waveguide and the remaining un-cured portions were removed with a solvent to form a nonlinear optical waveguide 3. Further the curable fluorine-containing prepolymer obtained in Preparation Example 3 was coated on the whole surface and was cured to make an outer clad layer 1. Then a gold electrode for driving of the device was formed as the top electrode 2 on the outer clad layer 1 on the top of the optical waveguide by photolithography. Thus a Mach Zehnder interferometer type optical device comprising the channel waveguide 3 was produced. After the production of the device, an end of the optical waveguide 3 was subjected to optical polishing. Light enters from the direction of an arrow 4 to the nonlinear optical waveguide 3 and leaves out in the direction of an arrow 8.

As a result of oscillation of Nd—YAG laser having an oscillation wavelength (1.06 μm) by edge coupler method, a transmission loss was 1.1 dB/cm and very excellent optic modulation characteristics were exhibited. An extinction ratio was 32 dB.

According to the present invention, there can be obtained a suitable nonlinear optical material by curing the fluorine-containing prepolymer to form a stable structure together with the nonlinear substance. When this fluorine-containing resin composition is used, an excellent nonlinear optical waveguide device can be produced by relatively simple steps while maintaining transparency in a near infrared region.

What is claimed is:

1. A fluorine-containing resin composition which is used for a nonlinear optical material and comprises (I) a fluorine-containing prepolymer and (II) an organic compound exhibiting a second- or higher-order nonlinear optical effect, characterized in that the fluorine-containing prepolymer (I):

(1) is a non-crystalline polymer having a fluorine content of not less than 25% by weight and (2) has a group Y$^1$ including a carbon-carbon double bond at an end of a polymer side chain, said group Y$^1$ is represented by the formula:

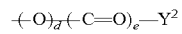

wherein Y$^2$ is an alkenyl group or fluorine-containing alkenyl group having 2 to 5 carbon atoms and having an ethylenic carbon-carbon double bond at an end thereof; d and e are the same or different and each is 0 or 1.

2. The fluorine-containing resin composition of claim 1 which is used for a nonlinear optical material, wherein the fluorine content of the fluorine-containing prepolymer (I) is not less than 40% by weight.

3. The fluorine-containing resin composition of claim 1 which is used for a nonlinear optical material, wherein the fluorine-containing prepolymer (I) is a polymer having a maximum absorption coefficient of not more than 1 cm$^{-1}$ in a wavelength range of from 1,290 to 1,320 nm.

4. The fluorine-containing resin composition of claim 1 which is used for a nonlinear optical material, wherein the fluorine-containing prepolymer (I) is a polymer having a maximum absorption coefficient of not more than 1 cm$^{-1}$ in a wavelength range of from 1,530 to 1,570 nm.

5. The fluorine-containing resin composition of claim 1 which is used for a nonlinear optical material, wherein the fluorine-containing prepolymer (I) is a polymer having a maximum absorption coefficient of not more than 1 cm$^{-1}$ in a wavelength range of from 600 to 900 nm.

6. The fluorine-containing resin composition of claim 1 which is used for a nonlinear optical material, wherein the carbon-carbon double bond is a radically reactive ethylenic carbon-carbon double bond.

7. The fluorine-containing resin composition of claim 1 which is used for a nonlinear optical material, wherein the carbon-carbon double bond is a cationically reactive ethylenic carbon-carbon double bond.

8. The fluorine-containing resin composition of claim 1 which is used for a nonlinear optical material, wherein the fluorine-containing resin composition comprises the fluorine-containing prepolymer (I), the nonlinear organic compound (II) and further an active energy curing initiator (III).

9. The fluorine-containing resin composition of claim 8 which is used for a nonlinear optical material, wherein the active energy curing initiator (III) is a photoradical generator (III-1).

10. The fluorine-containing resin composition of claim 8 which is used for a nonlinear optical material, wherein the active energy curing initiator (III) is a photoacid generator (III-2).

11. The fluorine-containing resin composition of claim 1 which is used for a nonlinear optical material, wherein the fluorine-containing prepolymer (I) is a fluorine-containing polymer which has a number average molecular weight of from 500 to 1,000,000 and is represented by the formula (1):

 (1)

in which the structural unit M is a structural unit derived from a fluorine-containing ethylenic monomer and represented by the formula (M):

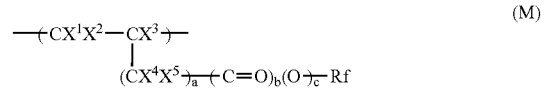

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

12. The fluorine-containing resin composition of claim 11 which is used for a nonlinear optical material, wherein at least one of $Y^1$ in Rf of said formula (M) is bonded to an end of Rf.

13. The fluorine-containing resin composition of claim 12 which is used for a nonlinear optical material, wherein $Y^1$ in Rf of said formula (M) is:

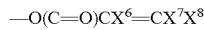

wherein $X^6$ is H, F, $CH_3$ or $CF_3$; $X^7$ and $X^8$ are the same or different and each is H or F.

14. A fluorine-containing nonlinear optical material obtained by curing the fluorine-containing prepolymer (I) in the fluorine-containing resin composition of claim 1.

15. The fluorine-containing nonlinear optical material of claim 14 which is obtained by photo-curing the fluorine-containing prepolymer (I).

16. An optical waveguide device having a nonlinear optical layer comprising the fluorine-containing nonlinear optical material of claim 14.

17. A fluorine-containing nonlinear optical material comprising a fluorine-containing polymer which has a number average molecular weight of from 500 to 1,000,000 and is represented by the formula (3):

—(M)—(M')—(A2)— (3)

in which the structural unit M is a structural unit derived from a fluorine-containing ethylenic monomer and represented by the formula (M):

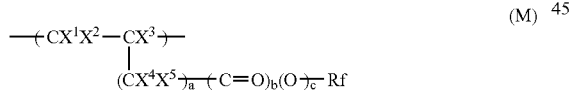

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit M' is a structural unit derived from a fluorine-containing ethylenic monomer and represented by the formula (M'):

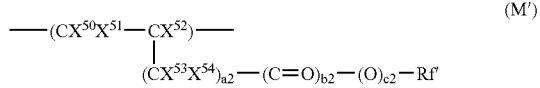

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; b2 and c2 are the same or different and each is 0 or 1, and the structural unit A2 is a structural unit derived from monomer copolymerizable with the fluorine-containing ethylenic monomers represented by the formulae (M) and (M'), and the structural unit M, the structural unit M' and the structural unit A2 are contained in amounts of from 0.1 to 99.9% by mole, from 0.1 to 99.9% by mole and from 0 to 99.8% by mole, respectively.

18. An optical waveguide device having a nonlinear optical layer comprising the fluorine-containing nonlinear optical material of claim 17.

19. A fluorine-containing resin composition which is used for a nonlinear optical material and comprises (I) a fluorine-containing prepolymer and (II) an organic compound exhibiting a second- or higher-order nonlinear optical effect, characterized in that the fluorine-containing prepolymer (I):

(1) is a non-crystalline polymer having a fluorine content of not less than 25% by weight and (2) has a carbon-carbon double bond at an end of a polymer side chain or at end of a polymer trunk chain, wherein the fluorine-containing prepolymer (I) is a fluorine-containing polymer which has a number average molecular weight of from 500 to 1,000,000 and is represented by the formula (1):

—(M)—(A)— (1)

in which the structural unit M is a structural unit derived from a fluorine-containing ethylenic monomer and represented by the formula (M1):

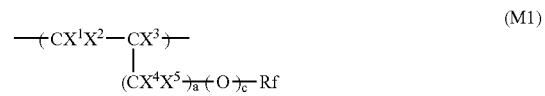

wherein $X^1$ and $X^2$ are the same or different and each is H or F; $X^3$ is H, F, $CH^3$ or $CF^3$; $X^4$ and $X^5$ are the same or different and each is H, F or $CF^3$; $R_f$ is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

20. A fluorine-containing resin composition which is used for a nonlinear optical material and comprises (I) a fluorine-containing prepolymer and (II) an organic compound exhibiting a second- or higher-order nonlinear optical effect, characterized in that the fluorine-containing prepolymer (I):

(1) is a non-crystalline polymer having a fluorine content of not less than 25% by weight and (2) has a carbon-carbon double bond at an end of a polymer side chain or at an end of a polymer trunk chain, wherein the fluorine-containing prepolymer (I) is a fluorine-containing polymer which has a number average molecular weight of from 500 to 1,000,000 and is represented by the formula (1):

 (1)

in which the structural unit M is a structural unit derived from a fluorine-containing ethylenic monomer and represented by the formula (M2):

 (M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

21. A fluorine-containing resin composition which is used for a nonlinear optical material and comprises (I) a fluorine-containing prepolymer and (II) an organic compound exhibiting a second- or higher-order nonlinear optical effect, characterized in that the fluorine-containing prepolymer (I): (1) is a non-crystalline polymer having a fluorine content of not less than 25% by weight and (2) has a carbon-carbon double bond at an end of a polymer side chain or at end of a polymer trunk chain, wherein the fluorine-containing prepolymer (I) is a fluorine-containing polymer which has a number average molecular weight of from 500 to 1,000,000 and is represented by the formula (1):

—(M)—(A)— (1)

in which the structural unit M is a structural unit derived from a fluorine-containing.ethylenic monomer and represented by the formula (M3):

 (M3)

wherein $R_f$ is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

22. A fluorine-containing nonlinear optical material comprising a non-crystalline fluorine-containing polymer which has a number average molecular weight of from 500 to 1,000,000 and is represented by the formula (2):

 (2)

in which the structural unit M' is a structural unit derived from a fluorine-containing ethylenic monomer and represented by the formula (M'-1):

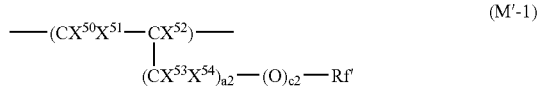 (M'-1)

wherein $X^{50}$ and $X^{51}$ are the same or different and each is H or F; $X^{52}$ is H, F, $CH_3$ or $CF_3$; $X^{53}$ and $X^{54}$ are the same or different and each is H, F or $CF_3$; Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond; a2 is 0 or an integer of from 1 to 3; c2 is 0 or 1.

23. A fluorine-containing nonlinear optical material comprising a non-crystalline fluorine-containing polymer which has a number average molecular weight of from 500 to 1,000,000 and is represented by the formula (2):

 (2)

in which the structural unit M' is a structural unit derived from a fluorine-containing ethylenic monomer and represented by the formula (M'-2):

 (M'-2)

wherein Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond.

24. A fluorine-containing nonlinear optical material comprising a non-crystalline fluorine-containing polymer which has a number average molecular weight of from 500 to 1,000,000 and is represented by the formula (2):

 (2)

in which the structural unit M' is a structural unit derived from a fluorine-containing ethylenic monomer and represented by the formula (M'-3):

 (M'-3)

wherein Rf' is a monovalent organic group in which at least one P (P is a moiety comprising an organic group exhibiting a nonlinear optical effect) is bonded to a fluorine-containing alkyl group having 1 to 40 carbon atoms or a fluorine-containing alkyl group having 2 to 100 carbon atoms and ether bond.

25. An optical waveguide device having a nonlinear optical layer comprising the fluorine-containing nonlinear optical material of claim 22.

26. An optical waveguide device having a nonlinear optical layer comprising the fluorine-containing nonlinear optical material of claim 23.

27. An optical waveguide device having a nonlinear optical layer comprising the fluorine-containing nonlinear optical material of claim 24.

* * * * *